(12) United States Patent
Tasler

(10) Patent No.: US 8,966,144 B2
(45) Date of Patent: *Feb. 24, 2015

(54) ANALOG DATA GENERATING AND PROCESSING DEVICE HAVING A MULTI-USE AUTOMATIC PROCESSOR

(75) Inventor: Michael Tasler, Würzburg (DE)

(73) Assignee: Papst Licensing GmbH & Co. KG, St. Georgen (DE)

( * ) Notice: Subject to any disclaimer, the term of this patent is extended or adjusted under 35 U.S.C. 154(b) by 1333 days.

This patent is subject to a terminal disclaimer.

(21) Appl. No.: 11/467,073

(22) Filed: Aug. 24, 2006

(65) Prior Publication Data

US 2007/0005823 A1    Jan. 4, 2007

Related U.S. Application Data

(60) Continuation of application No. 11/078,778, filed on Mar. 11, 2005, now abandoned, and a continuation of application No. 10/219,105, filed on Aug. 15, 2002, now Pat. No. 6,895,449, which is a division of application No. 09/331,002, filed on Jun. 14, 1999, now Pat. No. 6,470,399.

(30) Foreign Application Priority Data

Mar. 4, 1997  (DE) ..................................... 19708755
Mar. 3, 1998  (WO) ........................ PCT/EP98/01187

(51) Int. Cl.
*G06F 13/12*    (2006.01)
*G06F 13/38*    (2006.01)
*G06F 3/06*     (2006.01)

(52) U.S. Cl.
CPC ............ *G06F 13/385* (2013.01); *G06F 3/0605* (2013.01); *G06F 3/0607* (2013.01);

(Continued)

(58) Field of Classification Search
USPC .................................................. 710/1, 15, 63
See application file for complete search history.

(56) References Cited

U.S. PATENT DOCUMENTS 3,714,635 A    1/1973   Hamilton et al.
3,805,245 A    4/1974   Brooks et al.
(Continued)

FOREIGN PATENT DOCUMENTS

DE    3624373 A1    1/1987
DE    88 G 3559     3/1989
(Continued)

OTHER PUBLICATIONS

"OpenHCI Specification for USB" by Compaq, Microsoft, National Semiconductor, Oct. 10, 1996, Release V1.0a, pp. 1-146.*

(Continued)

*Primary Examiner* — Chun-Kuan Lee
(74) *Attorney, Agent, or Firm* — The Meola Firm, PLLC

(57) ABSTRACT

An interface device (10) provides fast data communication between a host device with input/output interfaces and a data transmit/receive device, wherein the interface device (10) comprises a processor means (13), a memory means (14), a first connecting device (12) for interfacing the host device with the interface device, and a second connecting device (15) for interfacing the interface device (10) with the data transmit/receive device. The interface device (10) is configured by the processor means (13) and the memory means (14) in such a way that, when receiving an inquiry from the host device via the first connecting device (12) as to the type of a device attached to the host device, regardless of the type of the data transmit/receive device, the interface device sends a signal to the host device via the first connecting device (12) which signals to the host device that it is communicating with an input/output device.

87 Claims, 2 Drawing Sheets

(52) U.S. Cl.
CPC ............ *G06F3/0613* (2013.01); *G06F 3/0661* (2013.01); *G06F 3/0664* (2013.01); *G06F 3/0676* (2013.01); *G06F 13/387* (2013.01)
USPC .......................................................... 710/63

(56) References Cited

U.S. PATENT DOCUMENTS

| | | | |
|---|---|---|---|
| 3,976,979 A | 8/1976 | Parkinson et al. | |
| 4,041,473 A | 8/1977 | Bardotti et al. | |
| 4,420,773 A | 12/1983 | Toyoda et al. | |
| 4,466,573 A | 8/1984 | Camboulives et al. | |
| 4,509,113 A | 4/1985 | Heath | |
| 4,642,759 A | 2/1987 | Foster | |
| 4,652,928 A * | 3/1987 | Endo et al. ................. | 348/219.1 |
| 4,680,732 A | 7/1987 | DiCenzo | |
| 4,787,027 A | 11/1988 | Prugh et al. | |
| 4,888,680 A | 12/1989 | Sander et al. | |
| 4,896,262 A | 1/1990 | Wayama et al. | |
| 4,901,275 A | 2/1990 | Hardie et al. | |
| 4,972,470 A | 11/1990 | Farago | |
| 5,014,186 A | 5/1991 | Chisholm | |
| 5,034,598 A | 7/1991 | Poland | |
| 5,070,474 A | 12/1991 | Tuma et al. | |
| 5,088,033 A | 2/1992 | Binkley et al. | |
| 5,129,036 A | 7/1992 | Dean et al. | |
| 5,131,089 A | 7/1992 | Cole | |
| 5,197,128 A | 3/1993 | Campbell et al. | |
| 5,214,761 A | 5/1993 | Barrett et al. | |
| 5,214,785 A | 5/1993 | Fairweather | |
| 5,226,168 A | 7/1993 | Kobayashi et al. | |
| 5,230,065 A | 7/1993 | Curley et al. | |
| 5,231,501 A | 7/1993 | Sakai | |
| 5,275,327 A | 1/1994 | Watkins et al. | |
| 5,291,584 A | 3/1994 | Challa et al. | |
| 5,291,611 A | 3/1994 | Davis et al. | |
| 5,296,611 A | 3/1994 | Solladie et al. | |
| 5,297,124 A | 3/1994 | Plotkin et al. | |
| 5,303,326 A | 4/1994 | Dean et al. | |
| 5,357,519 A * | 10/1994 | Martin et al. .................... | 714/25 |
| 5,369,484 A | 11/1994 | Haugen | |
| 5,371,885 A | 12/1994 | Letwin | |
| 5,379,382 A | 1/1995 | Work et al. | |
| 5,386,518 A | 1/1995 | Reagle et al. | |
| 5,402,170 A | 3/1995 | Parulski et al. | |
| 5,428,357 A | 6/1995 | Haab et al. | |
| 5,430,855 A | 7/1995 | Walsh et al. | |
| 5,440,699 A | 8/1995 | Farrand et al. | |
| 5,444,644 A | 8/1995 | Divjak | |
| 5,457,784 A | 10/1995 | Wells et al. | |
| 5,457,785 A | 10/1995 | Kikinis et al. | |
| 5,463,772 A | 10/1995 | Thompson et al. | |
| 5,465,106 A | 11/1995 | Keech et al. | |
| 5,473,765 A | 12/1995 | Gibbons et al. | |
| 5,475,441 A | 12/1995 | Parulski et al. | |
| 5,479,206 A | 12/1995 | Ueno et al. | |
| 5,487,154 A | 1/1996 | Gunji | |
| 5,493,335 A | 2/1996 | Parulski et al. | |
| 5,499,378 A | 3/1996 | McNeill, Jr. et al. | |
| 5,506,617 A | 4/1996 | Parulski et al. | |
| 5,506,692 A | 4/1996 | Murata | |
| 5,508,821 A | 4/1996 | Murata | |
| 5,510,774 A | 4/1996 | Phillips | |
| 5,515,474 A | 5/1996 | Deacon et al. | |
| 5,524,047 A | 6/1996 | Brown et al. | |
| 5,528,765 A | 6/1996 | Milligan | |
| 5,530,858 A | 6/1996 | Stanley et al. | |
| 5,532,825 A | 7/1996 | Lim et al. | |
| 5,537,597 A | 7/1996 | Sandage | |
| 5,539,535 A | 7/1996 | Aizawa et al. | |
| 5,548,782 A | 8/1996 | Michael et al. | |
| 5,548,783 A | 8/1996 | Jones et al. | |
| 5,570,146 A | 10/1996 | Collette | |
| 5,574,859 A | 11/1996 | Yeh | |
| 5,576,757 A * | 11/1996 | Roberts et al. ............. | 348/220.1 |
| 5,579,529 A | 11/1996 | Terrell et al. | |
| 5,581,741 A | 12/1996 | Clark et al. | |
| 5,596,628 A | 1/1997 | Klein | |
| 5,614,344 A | 3/1997 | Kawakami et al. | |
| 5,614,670 A | 3/1997 | Nazarian et al. | |
| 5,614,948 A * | 3/1997 | Hannah ......................... | 348/255 |
| 5,619,659 A | 4/1997 | Kikinis et al. | |
| 5,625,800 A | 4/1997 | Brayton et al. | |
| 5,625,840 A | 4/1997 | Numata et al. | |
| 5,628,030 A | 5/1997 | Tuckner | |
| 5,630,164 A | 5/1997 | Williams et al. | |
| 5,634,075 A * | 5/1997 | Smith et al. ....................... | 710/9 |
| 5,638,299 A | 6/1997 | Miller | |
| 5,639,606 A | 6/1997 | Willey | |
| 5,640,204 A | 6/1997 | Tsutsui | |
| 5,663,901 A | 9/1997 | Wallace et al. | |
| 5,668,976 A | 9/1997 | Zook | |
| 5,689,710 A | 11/1997 | Stanley et al. | |
| 5,692,159 A | 11/1997 | Shand | |
| 5,696,970 A | 12/1997 | Sandage et al. | |
| 5,703,584 A | 12/1997 | Hill | |
| 5,712,682 A | 1/1998 | Hannah | |
| 5,724,155 A | 3/1998 | Saito | |
| 5,724,574 A | 3/1998 | Stratigos et al. | |
| 5,742,934 A * | 4/1998 | Shinohara .................... | 711/103 |
| 5,748,924 A | 5/1998 | Llorens et al. | |
| 5,754,227 A | 5/1998 | Fukuoka | |
| 5,764,546 A | 6/1998 | Bryant et al. | |
| 5,765,027 A | 6/1998 | Wang et al. | |
| 5,778,205 A | 7/1998 | Orimoto | |
| 5,778,384 A | 7/1998 | Provino et al. | |
| 5,784,581 A | 7/1998 | Hannah | |
| 5,790,193 A | 8/1998 | Ohmori | |
| 5,794,032 A | 8/1998 | Leyda | |
| 5,802,325 A | 9/1998 | Le Roux | |
| 5,802,385 A | 9/1998 | Densham et al. | |
| 5,806,072 A | 9/1998 | Kuba et al. | |
| 5,812,879 A | 9/1998 | Moro | |
| 5,815,201 A | 9/1998 | Hashimoto | |
| 5,815,205 A | 9/1998 | Hashimoto et al. | |
| 5,822,614 A | 10/1998 | Kenton et al. | |
| 5,841,471 A | 11/1998 | Endsley et al. | |
| 5,844,961 A | 12/1998 | McEvoy et al. | |
| 5,845,094 A | 12/1998 | Beauchamp et al. | |
| 5,848,420 A | 12/1998 | Xu | |
| 5,854,905 A | 12/1998 | Garney | |
| 5,854,949 A | 12/1998 | Furukawa et al. | |
| 5,871,368 A | 2/1999 | Erdner et al. | |
| 5,875,415 A | 2/1999 | Lieb et al. | |
| 5,877,975 A | 3/1999 | Jigour et al. | |
| 5,878,248 A | 3/1999 | Tehranian et al. | |
| 5,881,366 A | 3/1999 | Bodenmann et al. | |
| 5,884,103 A | 3/1999 | Terho et al. | |
| 5,892,939 A | 4/1999 | Call et al. | |
| 5,914,748 A * | 6/1999 | Parulski et al. ................ | 348/239 |
| 5,915,106 A | 6/1999 | Ard | |
| 5,917,545 A | 6/1999 | Kowno et al. | |
| 5,920,709 A | 7/1999 | Hartung et al. | |
| 5,923,193 A | 7/1999 | Bloch et al. | |
| 5,926,208 A | 7/1999 | Noonen et al. | |
| 5,928,347 A | 7/1999 | Jones et al. | |
| 5,929,903 A | 7/1999 | Kiesow | |
| 5,930,480 A | 7/1999 | Staats | |
| 5,935,224 A | 8/1999 | Svancarek et al. | |
| 5,937,423 A | 8/1999 | Robinson | |
| 5,946,386 A | 8/1999 | Rogers et al. | |
| 5,948,091 A * | 9/1999 | Kerigan et al. .................. | 710/10 |
| 5,969,750 A * | 10/1999 | Hsieh et al. .................. | 348/14.1 |
| 5,974,161 A | 10/1999 | York | |
| 5,991,530 A | 11/1999 | Okada et al. | |
| 5,995,080 A | 11/1999 | Biro et al. | |
| 6,005,613 A | 12/1999 | Endsley et al. | |
| 6,012,113 A | 1/2000 | Tuckner | |
| 6,014,430 A | 1/2000 | Gosney et al. | |
| 6,023,292 A | 2/2000 | Wakui | |
| 6,026,217 A | 2/2000 | Adiletta | |
| 6,029,215 A | 2/2000 | Watts, Jr. et al. | |
| 6,067,584 A | 5/2000 | Hayles et al. | |
| 6,081,856 A | 6/2000 | Comer | |
| 6,086,430 A | 7/2000 | Amoni et al. | |

(56) References Cited

U.S. PATENT DOCUMENTS

| | | | |
|---|---|---|---|
| 6,088,532 A | 7/2000 | Yamamoto et al. | |
| 6,094,219 A | 7/2000 | Roberts et al. | |
| 6,098,116 A | 8/2000 | Nixon et al. | |
| 6,101,276 A | 8/2000 | Adiletta et al. | |
| 6,104,430 A | 8/2000 | Fukuoka | |
| 6,111,604 A * | 8/2000 | Hashimoto et al. | 348/220.1 |
| 6,119,180 A | 9/2000 | Terho et al. | |
| 6,131,125 A | 10/2000 | Rostoker et al. | |
| 6,147,703 A | 11/2000 | Miller et al. | |
| 6,149,316 A | 11/2000 | Harari et al. | |
| 6,163,344 A | 12/2000 | Kawamura et al. | |
| 6,182,145 B1 | 1/2001 | Schuman et al. | |
| 6,188,675 B1 | 2/2001 | Casper et al. | |
| 6,256,319 B1 | 7/2001 | Apgar et al. | |
| 6,256,452 B1 | 7/2001 | Yamamoto | |
| 6,260,102 B1 | 7/2001 | Robinson | |
| 6,286,073 B1 | 9/2001 | Vegter | |
| 6,292,589 B1 | 9/2001 | Chow et al. | |
| 6,298,388 B1 | 10/2001 | Taguchi | |
| 6,344,875 B1 | 2/2002 | Hashimoto et al. | |
| 6,424,809 B1 | 7/2002 | Yamamoto et al. | |
| 6,441,854 B2 | 8/2002 | Fellegara et al. | |
| 6,470,399 B1 | 10/2002 | Tasler | |
| 6,654,050 B2 | 11/2003 | Karube et al. | |
| 6,670,985 B2 | 12/2003 | Karube et al. | |
| 6,895,449 B2 | 5/2005 | Tasler | |
| 7,046,276 B2 | 5/2006 | Hashimoto et al. | |
| 2001/0050711 A1 | 12/2001 | Karube et al. | |

FOREIGN PATENT DOCUMENTS

| | | |
|---|---|---|
| DE | 390 332 B | 4/1990 |
| DE | 41 37 928 A1 | 5/1992 |
| DE | 195 28 889 A1 | 8/1995 |
| DE | 296 07 724 U1 | 4/1996 |
| DE | 195 28 889 A1 | 2/1997 |
| EP | 0 03 044 | 4/1984 |
| EP | 0 259 786 A1 | 9/1987 |
| EP | 0 391 157 A2 | 3/1990 |
| EP | 0 685 799 A1 | 5/1995 |
| EP | 0 705 037 A2 | 3/1996 |
| JP | 53145535 A | 12/1978 |
| JP | 61034652 A | 2/1986 |
| JP | 61060164 A | 3/1986 |
| JP | 63-133204 | 6/1988 |
| JP | 01303554 A | 7/1989 |
| JP | 01293404 A | 11/1989 |
| JP | 02-051727 | 2/1990 |
| JP | 02114351 A | 4/1990 |
| JP | 03-246654 | 11/1991 |
| JP | 04-133152 | 5/1992 |
| JP | 04-213715 | 8/1992 |
| JP | 04-309156 | 10/1992 |
| JP | 06-052087 | 2/1994 |
| JP | 06-067815 | 3/1994 |
| JP | 06-83917 | 3/1994 |
| JP | 06-090423 | 3/1994 |
| JP | 06-301607 | 10/1994 |
| JP | 6-301607 | 10/1994 |
| JP | 07-044290 | 2/1995 |
| JP | 07-177406 | 7/1995 |
| JP | 07-202982 | 8/1995 |
| JP | 8-110883 | 4/1996 |
| JP | 08-110883 | 4/1996 |
| JP | 08-130702 | 5/1996 |
| JP | H8-130702 * | 5/1996 |
| JP | 08-191375 | 7/1996 |
| JP | 8-191410 | 7/1996 |
| JP | 08-191412 | 7/1996 |
| JP | 08-223341 | 8/1996 |
| JP | 08-328990 | 12/1996 |
| JP | 09016506 A | 1/1997 |
| JP | 09-091237 | 4/1997 |
| JP | 10-177535 | 6/1998 |
| WO | WO 94/19746 | 9/1994 |

OTHER PUBLICATIONS

Robert Ristelhueber, "Plug and play is almost here. (automatic configuration of PCs and peripherals)," May 1994, Electronic Business Buyer, v20, n5, pp. 43-45.*
Analogic Corporation, "SCSI Real-Time Video Frame Grabber", 1992, 4 pages.*
Printouts made in 2007 from three web pages that concern commercial information about the Nikon Coolpix 100 camera. (English).
Manual for Nikon Coolpix 100 camera that was downloaded from Nikon's web site in 2007. (English).
Photocopies of materials that came with a used Nikon Coolpix 100 camera that was purchased in 2007 in Europe. (German and English).
A printout showing the file directory structure of the files contained in a CD-ROM that came with a used Nikon Coolpix 100 camera that was purchased in Europe in 2007. (English).
A file called "COOL110S.PDF" that is stored in the CD-ROM that came with the used Nikon Coolpix camera that was purchased in Europe in 2007, the document contained in this file being entitled "Nikon Camara Digital Coolpix 100 Manual del Usuario." (Spanish).
Pictures of a used Nikon Coolpix 100 camera that was purchased in the United States in 2007, one of the pictures showing the camera in a disassembled state.
A Nikon Coolpix 100 camera manual that was purchased in 2007 in the United States. (English).
Manual for Sony Digital Still Camera DSC-F1 (60 pages).
Sony PC Connecting Kit—Operating Instructions (127 pages).
Sony DSC-F1 Digital Still Camera (2 page).
Manual for Canon EOS-DCS 3C Digital Camera (314 pages).
Spec Sheet for Canon EOS-DCS 3C Digital Camera (2 pages).
Spec Sheet for Canon PS600 Digital Camera (1 page).
Information Regarding Olympus Camedia C-800L Digital Camera.
Kodak DC20 Camera Manual (37 pages).
Kodak DC 25 Camera Manual (47 pages).
Kodak Picture Easy Software (1 page).
Kodak Picture Works Software (2 pages).
Universal Serial Bus Specification, 1.0 Final Draft Revision, Nov. 13, 1995.
Universal Serial Bus Specification, Revision 1.0, Jan. 15, 1996.
Brochure for Nikon Coolpix 100 camera (English translation provided) (8 pages).
Nikon COOLPIX 100 Specification (4 pages).
Technical Specs—QV-10A—QV Series—Cameras—Products—CASIO (1 page).
QV-LINK Version 2.0 for Window (qvlink-readme.txt) (5 pages).
QV-10B Owner's Manuel (Casio) (23 pages).
IEEE Standard fora High Performance Serial Bus, 1996. 392 pp. (IEEE Std 1394-1995).
Digidesign 882/20 I/O Audio Interface Installation Guide, 14 pp.
Information Technology—Serial Bus Protocol 2 (SBP -2), T10 Project 1155D, Revision 4, May 19, 1998, 107 pp.
An American National Standard, IEEE Standard for a Simple 32-Bit Backplane Bus: NuBus; 1998, 51 pp. (ANSI/IEEE 1196-1987).
Polaroid Digital Camera PDC-2000 User Guide for Macintosh or Windows applications (142 pp.).
apple-history.com, Macintosh Quadra 650 (with NuBus Slots), Apple Computer, Inc., (produce introduced Oct. 93) Nov. 29, 2005, 2 pp.
Wang, James www.sims.berkeley.edu Third Party NuBus AV (Audio-Video) Cards, 1993-1996 1 pg.
Accredited Standards Committee X3, Information Technology, John Lohmeyer, X3T10/96-202r1, Agenda and Results of Meeting, X3T10 SCSI Working Group Meeting, Jul. 24, 1996 (6 pp.).
Intel Corporation, Universal Host Controller Interface Design Guide (UHCI), Revision 1.1, Mar. 1996 (47 pp.).
Twain Working Group Committee, Twain Toolkit Release V1.6, Twain Specification Release, Feb. 5, 1996 (367 pp.).

(56) References Cited

OTHER PUBLICATIONS

Digidesign Website, www.digidesign.com, Tabular cross-reference "Pro Tools 4.0.1 NuBus Systems Compatibility" as supported by Digidesign, Inc., Palo Alto, CA, 3 pp.
Twain Working Group, www.twain.org, About Twain, 4 pp.
Pournelle Alex, Jetsend Technology Allows Device connectivity with No Servers, Drivers, or Code, Computer Technology Review, Jul. 1999, vol. 19, Iss. 7, p. 22, 4 pp.
Business Editors/Technology Writers, Salutation Port-of-Entry Software Lets Application Developers Control Network Peripherals from the Windows Desktop, Business Wire, Jul. 13, 1998, p. 1 (3 pp.).
Wire Feed, HP Introduces JetSend for Pocket PC JetSend Solutions Now Compatible with Complete Range of Microsoft Windows CE- and Pocket PC-based Products, M2 Presswire, Apr. 26, 2000, p. 1 (3 pp.).
Stedman, John HP and TROY Group Extend JetSend Protocal to Simplify Printing Over Networks and the Internet; JetSend Protocal Expands Cutting-edge Capabilities to Non-HP Printers, HP Deskjet Printers, Legacy HP LaserJet Printers and Future Products, M2 Presswire, Feb. 10, 2000, p. 1 (2 pp.).
Business Editors, An Industry First, TROY Group's NetSend Makes Up to 9 Million HP Legacy Printers Internet-Ready, Business Wire, Nov. 16, 1999, p. 1 (3 pp.).
Keele, Richard Designing Control Units that Interface Peripherals to the IBM I/O Channel, Computer Technology Review, Fall 1988; vol. 8, Iss. 13, p. 71 (1 page).
Lang, Michael Optical Server Uses Network Protocal for Plug-and Play Integration, Computer Technology Review, Dec. 1993, vol. 13, Iss. 15, p. 85 (3 pp.).
Bursky, Dave Inter-System Communication Standard to Ease Clustered System Implementation, Electronic Design, Oct. 13, 1997, vol. 45, Iss. 22, p. 32 (3 pp.).
Hadden, Thomas H., Tape Drive Without Backup Software? Wait No More, Computer Technology Review Los Angeles, Oct. 1995, vol. 15 Iss. 10, p. 34 (4 pp.).
Ferelli, Mark, 12-inch WORM becomes the key to document image processing Computer Technology Review Los Angeles, Mar. 1994, vol. 14, Iss. 3, p. 1 (3 pp.).
Nelson, Andy Catching a Direct Bus. InfoWorld, Jun. 17, 1996, vol. 18, Iss. 25, p. 129 (2 pp.).
DeMonker, Judy 120 Moves Into Clustering, Storage Arenas, InfoWorld, Dec. 9, 1996, vol. 18, Iss. 50, p. 37 (2 pp.).
Krause, Reinhardt I/O Driver Spec to be Unveiled, Electronic News, Jan. 29, 1996, vol. 42, Iss. 2101, p. 1 (3 pp.).
Microsoft Windows 95 README for MS-DOS Device Drivers, Aug. 1995, p. 1 (2 pp.).
Lang, Michael Optical server uses network protocols for plug-and-play integration, Computer Technology Review: Special Fall Issue, Los Angeles, Dec. 1993, vol. 13, Iss. 15 p. 85 (6 pp.).
IEEE Standard for a High Performance Serial Bus, 1996. 392 pp. (IEEE Std 1394-1995).
apple-history.com, Macintosh Quadra 650 (with NuBus Slots), Apple Computer, Inc., (produce introduced Oct. 1993) Nov. 29, 2005, 2 pp.
Accredited Standards Committee X3, Information Technolgoy, John Lohmeyer, X3T10/96-202r1, Agenda and Results of Meeting, X3T10 SCSI Working Group Meeting, Jul. 24, 1996 (6 pp.).
Colloquim on "PC-Based Instrumentation" Martin, Steve; Digest No. 1990/025, The Institution of Electrical Engineers, London (4 pages).
High Speed PC-based Data Acquisition Systems, Payne, Jeffrey R, Bradford A. Menz, et al.; 1995 IEEE, pp. 2140-2145.
Implementing Remote Procedure Calls, Birrell, Andrew D. and Nelson, Bruce Jay; Xerox Palo Alto Research Center, ACM Transactions on Computer Systems, vol. 2, No. 1, Feb. 1984, pp. 39-59.
QV-10 Digital Camera—News Release Nov. 14, 1994 (Feb. 1995 correction) Portable Image Information Equipment of Multimedia Age—Liquid Crystal Digital Camera of Compact Size (Jun. 7, 2007) CAP-020276 (interne web pages) 4 pages.
It's the Most Effective, Cost-Sensitive Way to Publish Your Inventions; IBM Technical Disclosure Bulletin, vol. 38, No. 5, May 1995 (4 pages) CAP-020280.
Casio's QV-10: Portable Presentations (Oct. 1995) (2 pages).
About.com: Inventors—History of the Digital Camera, Bellis, Mary, 2 pages.
Wikipedia: Digital Camera (13 pages).
A Brief Info on Kodak DCS-Series Digital Still SLR Cameras (10 pages).
A Brief Info on Kodak DCS-Series Digital Still SLR Cameras Part II—DCS-400 Series with Nikon N90(s)/F90(x) Body Chassis (10 pages).
Card Information Structure of Nikon Coolpix 100 Memory.
USB: A Neat Package With a Fee Loose Ends; Author: Richard A. Quinnell; pp. 38-52; EDN Date: Oct. 24, 1996.
Thesis: Design and Construction of a Universal Data Acquisition and Control System for Scanning Probe Microscopy, Michael Tasler, The University of Texas at Austin, May 1996 (100 pages).
Plug and Play SCSI Specification, Version 1.0, Mar. 30, 1994 (26 pages).
Clarifications to the Plug and Play ISA Specification, Version 1.0a, Dec. 10, 19994 (Based on the results of the Plugfests held Jun. 6-8 and Oct. 11-13, 1994), (28 pages).
Plug and Play ISA Specification, Version 1.0a, May 5, 1994 (71 pages).
The SCSI Bus and IDE Interface Book; Author: Friedhelm Schmidt; Publication Date: Jun. 17, 1995 (German version published in 1993).
"Device Class Definition for Human Interface Devices (HID)" version 1.0—Final; Publication Date: Jun. 21, 1997.
"Derived Virtual Devices: A Secure Distributed File System Mechanism"; Publication Date: Sep. 17, 1996.
Camera Manufacturers Invalidity Contentions; Jun. 18, 2008.
Exhibit A to Reference No. 22.
Data Disasters: What Not to Do; Author; Michael Lang; Date: Dec. 1993.
PC-based Data Acquisition in an Industrial Environment; Author: Steve Martin; Date: 1990.
Jul. 1996 Apple article on SCSI drivers; Date: Jul. 3, 1996.
Designing Control Units; Author: Richard Keele; Date: Jan. 31, 1989.
Exhibit A40—Case 1:07-mc-00493-RCM; Document 139-42; Filed Jun. 18, 2008; p. 1 of 16.
Exhibit A41—Case 1:07-mc-00493-RCM; Document 139-43; Filed Jun. 18, 2008; p. 1 of 16.
Exhibit A42—Case 1:07-mc-00493-RCM; Document 139-44; Filed Jun. 18, 2008; p. 1 of 16.
Exhibit A43—Case 1:07-mc-00493-RCM; Document 139-45; Filed Jun. 18, 2008; p. 1 of 16.
Exhibit A44—Case 1:07-mc-00493-RCM; Document 139-46; Filed Jun. 18, 2008; p. 1 of 16.
Exhibit A45—Case 1:07-mc-00493-RCM; Document 139-47; Filed Jun. 18, 2008; p. 1 of 16.
Exhibit A46—Case 1:07-mc-00493-RCM; Document 139-48; Filed Jun. 18, 2008; p. 1 of 16.
Exhibit A47—Case 1:07-mc-00493-RCM; Document 139-49; Filed Jun. 18, 2008; p. 1 of 16.
Case 1:07-mc-00493-RMC; Document 160; Filed Jun. 30, 2008.
Case 1:07-mc-00493-RMC; Document 160-2; Filed Jun. 30, 2008.
Case 1:07-mc-00493-RMC; Document 160-3; Filed Jun. 30, 2008.
"About the SCSI Manager," Developer Connection—Inside Macintosh: Devices / Chapter 3-SCSI Manager (6 pgs), © Apple Computer, Inc., Jul. 3, 1996.
Clarifications to Plug and Play ISA Specification, Version 1.0a.
"Digital Video Camera Recorder—Digital Handycam DCR-VX1000," © 1995 by Sony Corporation.
"LK-12S for Windows 95—Connection Kit for the Casio LCD Digital Camera," QV-Link, Version 2.6 Owner's Manual.
"Plug and Play ISA Specification," Version 1.0a, © 1993,1994 by Intel Corporation and Microsoft Corporation.
"Plug and Play SCSI Specification," Version 1.0, © 1994 by Adaptec, AT&T Global Information Solutions, Digital Equip. Corp., Future Domain, Maxtor and Microsoft.

(56) References Cited

OTHER PUBLICATIONS

"Salutation Port-of-Entry Software Lets Application Developers Control Network Peripherals from the Windows Desktop," Desktop Business Wire, Inc., San Jose, CA, Jul. 13, 1998.
"The SCSI Bus and IDE Interface," Addison-Wesley, Sect. 4.2-25.2, pp. 183-301.
"Universal Serial Bus," http://www. homestayfinder.com/Dictionary. aspx?q=Universal_Serial_Bus.
"Universal Serial Bus," Wikipedia, http://www.en.wikipedia.org/wiki/USB.
Agrawal, Prathima, et al., "A Testbed for Mobile Networked Computing," AT&T Bell Laboratories, Murray Hill, NJ.
Annamalai et al., "Emerging High-Speed Local-Area Networks and Wide-Area Networks," Proceedings, SPIE (International Society for Optical Engineering), vol. 2608, Oct. 24-26, 1995 (Philadelphia, PA).
Apple Computer, Inc, Macintosh Quadra 700, Developer Technical Publications (1991).
Apple Computer, Inc., Chapter 1, "Hardware," Macintosh PowerBook 160 and Macintosh PowerBook 180 (2000).
Apple Computer, Inc., excerpt, "Devices," *Inside Macintosh* (1994).
Apple Technical Library, Chapters 1 and 2, "Introduction to File Management" and "File Manager," *Inside Macintosh* (1992).
Bowen, Jonathan, "A User-Friendly Interface Adapter" Computing Laboratory, Oxford University (Oxford, UK).
Business Wire, "HP Receives Industry's First indows 95 Flatbed-Scanner Certification; HP ScanJet 4c and 4p Scanners Now Provide Easy Installation," Published Nov. 11, 1996.
Casio, Owner's Manual for QV-10 B liquid crystal digital camera.
Chan et al. "A Mega-Pixel Resolution PC Digital Still Camera," *SPIE*, 2654:164-172 (1996).
Chapter 6, "Power Manager Reference".
Clarke, P., "Two European Vendors Roll Peripheral ICs," *Electronic Engineering Times*, No. 928 (Nov. 18, 1996).
Compaq, Intel, Microsoft, and NEC, "Universal Serial Bus Specification," Revision 1.1 (Sep. 23, 1998).
Correll, K., and Ulichney, R., "The J300 Family of Video anad Audio Adapters: Architecture and Hardware Design," *Digital Technical Journal*, vol. 7, No. 4 (1995).
Davis, T., "The Path to a Custom Lab is Through a PC and an External Interface," *Research & Development* (Apr. 1985).
DiNucci, Darcy, et al., excerpt, "SCSI ID," *Macintosh Bible* (5th Edition) translated to Japanese (1995).
Eastman Kodak User's Manual for "Kodak Professional DCS 200 Digital Camera" (1993).
Eastman Kodak User's Manual for EOS DCS 1, EOS DCS 3 and EOS DCS 5 digital cameras (1997).
Excerpt of chapter 6, Macintosh "SCSI ID" (1994).
Gadre, D., "Using the Parallel Adapter as a Host Interface Port: New Uses for Old Tools," *Dr. Dobb's Journal* (Apr. 1996).
Gallagher, Paul, "A MegaPixel Camera With SCSI Interface" (International Robots and Vision Automation Conference, May 9-11, 1995, Detroit, MI.
Gallant, John, "Advancing the Art of Industrial Video maging: CCD Cameras and Frame Grabbers," EDN Access, http://www.edn.com/archives/ 1996 /011896/ <http://www.edn.com/archives/%201996%20/011896/>02df2.htm.
Heiman, E., "Maximize Computer Storage with an IPI Controller: Integrate a High Data-Transfer Rate Disk Controller Into Your Computer System" (Apr. 13, 1989).
HighBeam Research, "1997 Technology Forecast," Published in Business New on Jan. 6, 1997.
Himowitz, M. J., "Digital Watching/Infotech/Technology Monitor,"*Time, Inc.* (Feb. 17, 1997).
Hitoshi et al., "High Definition Image Capturing Camera HC-1000," vol. 17, No. 16 (Mar. 4, 1993).
Hoffman, Gary, "A/V Digital Interface of Choice," IEEE 1394 (Jan. 1996).
HP Photosmart Digital Camera—How the HP PhotoSmart Digital Camera Works.
HP PhotoSmart Digital Camera—Product Overview.
HP PhotoSmart Digital Camera—Product Specifications (Model No. C5340A).
HP PhotoSmart Digita Camera C20/C30/C200 Series—TWAIN Technology Overview.
HP website, HP Photosmart digital camera—Accessories, Parts, Supplies, and Manuals.
HP website, HP Photosmart Digital Camera—What Ships in the Box.
hpNOW, "PhotoSmart System" (Mar. 18, 1997).
Isoyama et al., "ISDN Basic Interface for Sumistation," Sumitomo Electric Technical Review, No. 31 (Jan. 1991).
Jones, Douglas W., "Disk Interfaces," University of Iowa, Department of Computer Science (Fall 1996).
Kleiman, S., Vnodes: An Architecture for Multiple file SystemTypes in Sun UNIX (Sun Microsystems).
Kodak DCS-Digital Still SLR camera, "A brief info on Kodak DCS-Series Digital Still SLR cameras" (Oct. 30, 2006).
Kodak TIB4234, DCS 200 AC Power Adapter, Kodak Technical Information Bulletin (Jun. 2000).
Kodak User's Guide DC25 Digital Camera.
Lang, Michael, "Optical Server Uses Network Protocols for Plug-and-Play Integration," *Computer Technology Review* (Special Fall Issue, Dec. 1993).
Moore, D.J., "Multimedia Presentation Development Using the Audio Visual Connection," *IBM Systems Journal*, vol. 29, No. 4 (1990).
Müller, H., et al., "The CHI, a New Fastbust Interface and Processor," *IEE Transaction on Nuclear Science*, vol. 7, No. 2.
Nikon F-801s—N8008s Repair Manual, Nikon Corporation.
Nikon N8008s AF Instruction Manual.
Note, S., et al. "Rapid prototyping of DSP systems : requirements and solutions," pp. 88-96, 1074-6005/95 © 1995 IEEE.
Oda, K., et al., "The Development of Digital Still Camera Using 1.3M-Pixel VT-CCD Image Sensor," ITE Technical Report, vol. 19, No. 60 (Nov. 15, 1995).
Okuda, K., chapter from book, "MacRecorder," translated to Japanese (Jul. 20, 1992).
Pournelle, A., "JetSend Technology Allows Device Connectivity With No Servers, Drivers, or Code—Company Business and Marketing," Computer Technology Review (Jul. 1999).
Quinnell, R., "The Mighty Morphin' PCI Bus," *EDN* (Apr. 25, 1996).
Rieg, E., "Improved design avoids bottlenecks," Elektronik, Sep. 29, 1989; 38(20): pp. 52-56, (German) English translation.
Sawert, B. "The Advanced SCSI Programming Interface," *Dr. Dobbs Journal* (Mar. 1994).
Schmidt, F. "SCSI-Bus und IDE-Schnittstelle," Sect. 3.5-3.17.3, pp. 174-316.
Schmidt, F. "The SCSI Bus and IDE Interface—Protocols, Applications and Programming," translated (English) from the German edition SCSI-Bus unds IDE-Schnittstelle, Addison-Wesley (Deutschland) GmbH.
Section 5, "Using the DCS 200 Camera with a PC," of Kodak User's Manual.
Section 8, "Reference-Kodak Driver for Aldus PhotoStyler Software," of Kodak User's Manual.
Sheppard et al., "Engineering Advances: New Opportunities for Biomedical Engineers," Proceedings of the 16th Annual International Conference of the IEEE Engineering in Medicine and Biology Society, vol. 16 (Nov. 3-6, 1994).
Simpson, R. W., "High Performance, Dual Speed CCD Camera System for Scientific Imaging," SPIE, vol. 2654 (Jan. 31, 1996).
Slater, M., "Universal Serial Bus to Simplify PC/IO: New Interface to Service Keyboards, Mice, Telecom, and More," *Microprocessor Report*, vol. 9, No. 5 (Apr. 17, 1995).
Sony Semiconductor, "New Interface of Digital Network Age," IEEE 1394.
Spragens, J., "Kodak DCS 420 Takes Photographers Out of the Darkroom and Onto Disk," *InfoWorld* (Feb. 13, 1995).
SystemSoft® Corporation and Intel Corporation®, "Universal Serial Bus Common Class Specification" (Dec. 16, 1997).
Tatkow, M., et al. "New techniques for high-speed data acquisition," p. 39-49; Electronic Engineering, vol. 62, No. 765 (Sep. 1990).
Universal Serial Bus Mass Storage Class; UFI Command Specification, Revision 1.0.

(56) References Cited

OTHER PUBLICATIONS

USB Implementers' Forum, "Universal Serial Bus (USB): Device Class Definition for Human Interface Devices (HID)," Version 1.0-Final (1997).
Van Meter, Rodney, et al. (University of Southern California, Information Sciences Institute), "Derived Virtual Devices: A Secured Distributed File System Mechanism," Fifth NASA Goddard Space Flight Center Conference on Mass Storage Systems and Technologies (Sep. 17, 1996).
Wetzel, A. T. and Schell, M.R., "Consumer Applications of the IEEE 1394 Serial Bus, and a 1394/DV Video Editing System," presented at International Conference on Consumer Electronics (Chicago, IL),conference session WPM-6, Intelligent Home Networks.
Williams, tom, "Host-Access Standardization Efforts Ready SCSI for Widespread Use," *Computer Design* (Mar. 1, 1989) 18(2).
Wright, M., "New Peripheral Interfaces: Fast and Full of Features," *EDN* (Oct. 12, 1995).
Wright, M., "USB and IEEE 1394: Pretenders, Contenders, or Locks for Ubiquitous Desktop Deployment?" *EDN* (Apr. 25, 1996).
Yamashina, T. and Ichimura, E., "High Quality Digital Camera," ITE Technical Report, vol. 20., No. 58 (Nov. 15, 1996).
Misc. Action—*HP v Papst*—Case 1:07-mc-00493-RMC; Document 178; Filed Jul. 11, 2008; p. 1-23.
Exhibit A—Case 1:07-mc-00493-RMC; Document 178-2; Filed Jul. 11, 2008; p. 1-6.
Exhibit A63—Case 1:07-mc-00493-RMC; Document 178-3; Filed Jul. 11, 2008; p. 1-14.
Exhibit A64—Case 1:07-mc-00493-RMC; Document 178-4; Filed Jul. 11, 2008; p. 1-14.
Exhibit A65—Case 1:07-mc-00493-RMC; Document 178-5; Filed Jul. 11, 2008; p. 1-25.
Exhibit A66—Case 1:07-mc-00493-RMC; Document 178-6; Filed Jul. 11, 2008; p. 1-25.
Exhibit A67—Case 1:07-mc-00493-RMC; Document 178-7; Filed Jul. 11, 2008; p. 1-13.
Exhibit A68—Case 1:07-mc-00493-RMC; Document 178-8; Filed Jul. 11, 2008; p. 1-15.
Exhibit A69—Case 1:07-mc-00493-RMC; Document 178-9; Filed Jul. 11, 2008; p. 1-24.
Exhibit A70—Case 1:07-mc-00493-RMC; Document 178-10; Filed Jul. 11, 2008; p. 1-22.
Exhibit A71—Case 1:07-mc-00493-RMC; Document 178-11; Filed Jul. 11, 2008; p. 1-19.
Exhibit A72—Case 1:07-mc-00493-RMC; Document 178-12; Filed Jul. 11, 2008; p. 1-17.
Exhibit A73—Case 1:07-mc-00493-RMC; Document 178-13; Filed Jul. 11, 2008; p. 1-13.
Exhibit A74—Case 1:07-mc-00493-RMC; Document 178-14; Filed Jul. 11, 2008; p. 1-15.
Exhibit A75—Case 1:07-mc-00493-RMC; Document 178-15; Filed Jul. 11, 2008; p. 1-14.
Exhibit A76—Case 1:07-mc-00493-RMC; Document 178-16; Filed Jul. 11, 2008; p. 1-14.
Exhibit A77—Case 1:07-mc-00493-RMC; Document-178-17; Filed Jul. 11, 2008; p. 1-18 .
Exhibit A78—Case 1:07-mc-00493-RMC; Document 178-18; Filed Jul. 11, 2008; p. 1-24.
Exhibit A79—Case 1:07-mc-00493-RMC; Document 178-19; Filed Jul. 11, 2008; p. 1-28.
Geotext Translations, Inc. State of New York, County of New York Certification and SCSI-2 Detailed Explanation; Latest SCSI Standard and Command Reference; Authored by Seiichi Sugaya.
Introduction to Macintosh Sound by Kazuhito Okuda.
Geotext Translations, Inc. Stat of New York, County of New York Certification and Macintosh Bible 5th Edition—Japanese Version; Technical Core Translation; Gijutsu-Hyohron Co. Ltd.
Article: Nov. 11, 1996 HP Receives Industry's First Windows 95—Flatbed-Scanner Certification; HP ScanJet 4c and 4p Scanners Now Provide Easy Installation; http://findarticles.com.
Nikon Corporation's and Nikon Inc.'s Supplemental Invalidity Contentions.
Communications Kodak Professional Digital Camera System (Excerpts)—Copyright Date of 1991.
User's Manual EOS•DCS 1, 3 and 5 Digital Cameras— Copyright Date of 1991.
Fujix Software Owner's Manual—Copyright Date Unknown.
Exhibit A80—Case 1:07-mc-00493-RMC; Document 187-2; Filed Jul. 23, 2008; pp. 1-23.
Exhibit A to HP's Subpoeana dated Jul. 29, 2008 to Analogic Corporation in connection with MDL.
Documents Produced by Analogic in response to HP's Subpoean dated Jul. 29, 2008 to Analogic Corporation.
United States District Court for the District of Columbia in regard to Papst Licensing GmbH & Co. KG Litigation; Misc. Action No. 07-493 (RMC); MDL No. 1880; Camera Manufacturers' First Supplemental Invalidity Contentions.
Exhibit A81.
Exhibit A82.
Exhibit A83.
Camera Manufacturers' Statement on the Absence of Need for Extensive Discovery Prior to A Markman Hearing; Filed Apr. 4, 2008; 5pp. 1-11.
Exhibit A to Reference 1.
Exhibit B to Reference 1.
Exhibit C to Reference 1.
Exhibit D to Reference 1.
Exhibit E to Reference 1.
Exhibit F to Reference 1.
Camera Manufacturer's Opening Markman Brief; Filed Jul. 23, 2008; pp. 1-55.
Exhibit A to Reference 8.
Exhibit B to Reference 8.
Exhibit C to Reference 8.
Exhibit D to Reference 8.
Exhibit E to Reference 8.
Exhibit F to Reference 8.
Exhibit G to Reference 8.
Exhibit H to Reference 8.
Exhibit I to Reference 8.
Exhibit J to Reference 8.
Exhibit K to Reference 8.
Exhibit L to Reference 2.
Exhibit M to Reference 2.
Exhibit N to Reference 2.
Exhibit O to Reference 2.
Exhibit P to Reference 2.
Exhibit Q to Reference 2.
Camera Manufacturers' Surreply Markman Brief; Aug. 6, 2008; pp. 1-36.
Exhibit R to Reference 26.
Exhibit S to Reference 26.
Exhibit T to Reference 26.
Exhibit U to Reference 26.
Exhibit V to Reference 26.
"14-Bit, 2 MHz A-to-D SCSI Substation," Analogic® (1992).
"Casio's QV-10: Portable Presentations," (2005), Retrieved from the Internet on Jun. 7, 2007: URL:http://www.byte.com/art/9510/sec10/art10.htm.
"Inside Macintosh—Devices," Addison-Wesley Publishing Company.
"Inside Macintosh by Apple Computer Inc.—Files" Apple Technology Library.
"TRI/+ Program Shippable Products Catalog," Digital Equipment Corporation (1992).
Casio, "Owner's Manual," QV-LINK version 2.6.
Chan, "Kodak Will Market Sandisk's CompactFlash Storage Cards Under Kodak Label a Storage Media for Kodak's New DC25 Camera," SanDisk Corporation, Retrieved from the Internet on Jul. 10, 2008: URL:http://web.archive.org/web/19961114111959/www.sandisk.com/sd/pr/kodak-ct/htm.

(56) References Cited

OTHER PUBLICATIONS

Chan, "Matsushita Introduces New Digital Camera That Uses SanDisk's CompactFlash Cards as the Digital Film," SanDisk Corporation, Public Relations (1997).
Chan, "SanDisk to Supply Polaroid with Flash Film for New PDC-2000 Digital Camera," SanDisk Corporation, Retrieved from the Internet on Jul. 10, 2008: URL:http://web.archive.org/web/19961114112006/www.sandisk.com/sd/pr/polaroid.htm.
McClelland, Deke, Color Quick Cam, Low-Cost Camera for Passable Digital Video; Macworld; Sep. 1996; 13, 9; ABI/Inform Global p. 79 http://www.adobe.com.
Chapter 8, "Reference—Kodak Driver for Aldus PhotoStyler Software."
Mannes, "Picture This . . . Filmless Digital Camera New Developments in the World of Photography Make it a Snap to get your Pictures onto Your Computer and Out on the Web," (1996).
McClelland, "Polaroid PDC-2000, New Breed of Camera Creates Images as Cool as its hardware," Magazine Review, (1996), available at http://web.archive.org/19970613215959/www.macworld.com/pages/august.96/Reviews.2274.html.
QV-10 Digital Camera, "New Product News," (1995).
Rutter, "Digital Still Cameras," (1996).
SanDisk PCMCIA FlashDisks and Windows 95.
Unno et al., "32 MByte High Performance Solid State Disk," *OKI Technical Review*,155:17-20 1996.
User Guide for SanDisk PC Card ATA FlashDisk Series.
Weber, "Different Architectures—Each With Advantages, Disadvantages—Vie for Predominance—Innovations Light Fuel under Flash Memory," *Electronic Engineering Times*, 878:1-6 1995.
Morgenstern, "Digital 'cheese'," Home Office Computing, 14(1):82-85 (1996).
Sean Wogstaff; Power Macs get down to better business applications; MACWEEK—Product Watch Jan. 2, 1995 (pp. 79-80).
Galen Gruman; The New Windows; MACWORLD, Feb. 1995 (pp. 104-108).
Business Wire; Connectix Announces QuickCam for Windows; $99 digital camera is first low-cost video input device for Windows users; Apr. 24, 1995; Copyright 1995 Business Wire, Inc. (pp. 1-2).
Canon—PowerShot 600—Digital Photography; English Edition 2CV 1000 ENG 0796 @ Canon Europa N. V.; 1996.
Connectix for Windows QuickCam User Guide; Sep. 1995.
QuickCam Read Me; Release 1.0.3; Apr. 19, 1995 (pp. 1-5).
PR Newswire; Microsoft Announces Video for Windows 1.1e; Section: Financial News; Dated: Mar. 1, 1995 (pp. 1-2).
Wescon®/96 Conference Proceedings—Anaheim Convention Center, Anaheim, California; Oct. 22-24, 1996; Sponsor by: Los Angeles and San Francisco Bay Area Conuncils, IEEE Souther and Northern California Charters, ERA; pp. 395-401.
Proceedings—IEEE Compcon 97; Feb. 23-26, 1997; Sponsored by IEEE Computer Society; Copyright © 1997 by the Institute of Electrical and Electronics Engineers, Inc.: Title: Pippin: Adapting PC Technology for the Technophobe.
Ricoh Camera SoftwareSpeed Images to PC; Dateline: Fremont, California, USA: Load-Date: Jul. 7, 1998; Copyright 1997 Post-Newsweek Business Information Inc.; 5 of 33 Documents Newsbytes, Feb. 24, 1997, Monday.
Ricoh Offers Highest Resolution Digital Camera with Lowest Price in its Class; Load Date: Feb. 12, 1997; Copyright 1997—Business Wire, Inc. ; 1 of 8 Documents; Feb. 11, 1997, Tuesday.
Apple's New Professional Power Macintosh Computers Feature Performance, Design Innovation, and Aggressive Pricing, New Line Includes High-Performance PowerPC Processors at 233 MHz; Load-Date: Feb. 18, 1997; Copyright © 1997 PR Newswire Association, Inc.; 1 of 3 Documents; Feb. 17, 1997, Monday.
Compaq Takes Multimedia to the Max; Launches All New Intel MMX Technology-Based Presario PCs; Load-Date: Jan. 9, 1997 Copyright© 1997—Business Wire, Inc.; 16 of 213 Documents; Jan. 8, 1997, Wednesday; 6 Pages.
Compaq Lowers U. S. Prices on Popular Presario Home PCs; Load Date: Nov. 15, 1996; Copyright © 1996—Business Wire, Inc.; 3 of 14 Documents; Nov. 14, 1996.
Ricoh Digital Camera RDC-2 Operational Manual; pp. 1-84.
Power Macintosh User's Guide; Apple Computer, Inc. ; Copyright © 1996; 162 Pages.
Macintosh System 7.5 Upgrade Guide Apple Computer, Inc.; Copyrigh t © 1994; 115 Pages.
Power Macintosh 9500/200—Technical Specifications 2 Pages.
Technical Information Specifications for Power Macintosh 9500 Series Computers; 14 Pages.
Compaq Product Specifications; QuickSpecs Compaq Presario 8712; Sep. 1996; Model Presario 8712; 3 Pages.
Bill Woodland (wcw@bga.com) Mini Faq Again; Sunday, Sep. 8, 1996; 6 Pages.
Compaq—Compaq begins shipment of popular Presario 3000 and 1000 series home PCs; Oct. 25, 1996.
T. R. Reid, The Washington Post Staff Writer; Modem Trouble Underscores Need for Simpler Products; Nov. 8, 1993 Final Edition.
Full Motion Video Capture Card for $199.00; Jul. 11, 1996: Copyright 1996; Newswire Association, Inc.
Microtest Announces DiscPort Tower™; Complete Plug-n-Play CD-ROM Networking Solution; Microtest Inc.—Mar. 10, 1995.
Julio Ojeda-Zapata, Staff Writer—News Bank Inc.—Access World News; Tech Toys//From Cell Phones to Time Machines, It's Gifts Yule Love: Dec. 9, 1996.
Charlie Paschal, Staff Writter—News Bank Inc.—Access World News; Adding Hardware Causes Problems; Jan. 13, 1997.
Kodak DC25 Digital Camera User's Guide for Camera and Software. Inside Macintosh—Devices.
Polaroid CTC Mac Magazine Review—Polaroid PDC—2000.
Coolpix 100—Nikon Digital Camera E 1100 User's Manual—Nikon.
HP Photosmart Digital Camera—What ships in the Box.
HP Photosmart Digital Camera—How the HP PhotoSmart Digital Camera Works; pp. 1-2.
HP Photosmart Digital Camera—Product Overview; pp. 1-4.
HP Photosmart Digital Camera—Product Specifications; pp. 1-9.
HP Photosmart Digital C20/C30/C200 Series—Twain Technology Overview; pp. 1-2.
HP Photosmart Digital Camera—Accessories, Parts, Supplies, and Manuals.
HP Photosmart Digital Camera How the HP PhotoSmart Digital Camera Works; pp. 1-2.
HpNow—Mar. 18, 1997—Photosmart System.
Frequently Asked Questions About Digital Camera Memory Cards—Question and Answer; pp. 1-4.
Mobile Data Storage & Digital Camera Film Alternatives: CompactFlash™ and MiniCard.
FlashDrive Application Note—Configuring Your System for the FlashDrive.
SanDisk—Matsushita Introduces New Digital Camera That Uses SanDisk's CompactFlash Cards the Digital Film; Contact: Nelson Chan.
SanDisk Application Note—Differences Between PC Card ATA and CompactFlash ; 1996.
SanDisk Corporation—ABC's of PCMCIA—General Information; pp. 1-7; dated Jul. 10, 2008.
SanDisk Corporation—ABC's of PCMCIA—Technical Information; pp. 1-5; Jul. 10, 2008.
SanDisk Corporation—ABC's of PCMCIA—Flash Disk Information; pp. 1-5; Jul. 10, 2008.
SanDisk Corporation—Frequently Asks Questions About Digital Camera Memory Cards; p. 1-4; Jul. 10, 2008.
SanDisk Corporation—Product Information; SanDisk Products Spect; Jul. 10, 2008.
SanDisk Corporation—SanDisk Announces HP Branded Compact Flash Storage Cords for Kodak's New DC25 Camera; Public Relation-; Contact Nelson Chan; Jul. 10, 2008.
SanDisk Corporation—SanDisk IDE FlashDrive Specification; Interface—1.3" FlashDrive IDE & 1.8" FlashDrive IDE System Performance (Notes 1 & 2).

(56) References Cited

OTHER PUBLICATIONS

SanDisk Corporation—SanDisk Introduces Flash Chipset—World's Smallest Embedded Soild-State ATA Data Storage System, Jul. 10, 2008.
SanDisk Corporation—SanDisk Introduces Flash Chipset—Worlds Smallest Embedded Solid-State ATA Data Storage System.
SanDisk Corporation—SanDisk PCMCIA Type II Flash Disk Specification 2MB through 85MB Capacities; Jul. 10, 2008.
SanDisk Corporation—SanDisk to Supply Sony Electronics With Digital Flash Film for Sale With Sony's New DKC-1D1 Digital Camera; Contact: Nelson Chan; Jul. 10, 2008.
SanDisk Corporation—SanDisk Type III FlashDisk; Interface—PCMCIA PC Card ATA and True IDE Mode System Performance (Notes 1 & 2); Jul. 10, 2008.
SanDisk Corporation—SanDisk to Supply Polaroid with Flash Film for New PDC-2000 Digital Camera; Contact: Nelson Chan; Jul. 10, 2008.
SanDisk Introduces World's First 85MB Type II Flash Card; More Than Doubles Industry Capacity; Contact: Nelson Chan.
Macintosh Power Book.
Macintosh Quadra 700—Developer Note—Developer Technical Publications; Apple Computer Inc. 1991.
Polaroid Annual Report 1996.
8 Reference—Kodak Driver for Aldus PhotoStyler Software.
A brief into on Kodak DCS-Series Digital Still SLR Cameras.
Home—Photography in Malasia; Copyright © 2000—leofgo® MIR Web Development Team.
Liquid Crystal Digital Camera; QV-10B Owners Manual Casio.
QV-Link Version 2.6; LK-125 for Windows 95; Connection Kit for the Casio LCD Digital Camera—Owner's Manual—Casio.
Using the DCS 200 Camera with a PC.
The New York Times, Mar. 12, 1996—Polaroid to Sell Digital Camera.
Electronic Engineering Times, Inc. 1995, n 878, p. 57; Samuel Weber; Publication date Apr. 12, 1995;—Different Architectures each with Advantages, Disadvantages, via for Predominance—Innovations Light Fuse Under Flash Memory.
User Guild for SanDisk PC Card ATA FlashDisk Series.
User's Manual EOS•DCS 1, 3 and 5 Digital Cameras—Copyright Date of 1991.
User's Manual EOS-DCS 1, 3 and 5 Digital Cameras—Copyright Date of 1991.
User's Manual Kodak Professional Digital Camera System (Excerpts)—Copyright Date of 1991.
Kodak Professional DCS 200 Digital Camera (in Japanese language).
The Toronto Sun, Mar. 20, 1996, Wednesday, Final Edition; Technology Gets EZ; ByLine: Jeff Rickard; Copyright 1996 Toronto Sun Publishing Corporation; p. 1.
ProQuest—Microsoft's Plug and Play modems Offer Ease, Speed, Quality and Low Price Tag by Barry D. Bayer and Benjamin H. Cohen; The Daily Record, Baltimore, Md.: Nov. 8, 1996; p. 1.
ProQuest—The Atlanta Journal—Consitution; Personal Technology Computer Report External CD-ROM drive and important upgrade for laptop; Brit Hume & T. R. Reid. The Atlanta Constitution (pre-1997 Fulltext). Atlanta, Ga.: Sep. 17, 1995; p. G.4.
The Irish Times, Nov. 6, 1995, City Edition—Post Modem—Absolute Beginners: In the second article on getting started with comms, Fiachra O Marcaigh covers installing a new modem and making that first call; Byline: Fiachra O Marcaigh; pp. 1-4.
PR Newswire, Jun. 18, 1996, Tuesday—External, Parallel Port Backup System Now Available From Exabyte's Eagle™ Division; pp. 1-2.
M2 Presswire, Sep. 26, 1996, Shuttle Technology—Shuttle cuts cost of shuttle connection; Highlight: Adapter delivers low cost parallel port connectivity for SCSI peripherals; pp. 1-2.
M2 Presswire, Jun. 30, 1995—Memory Technology Announces a New Range of portable Backup and Storage Devices; pp. 1-2.
IBM® Technical Disclosure Bulletin; vol. 39 No. 01; Jan. 1996; Entitled: Device Drivers via the Access Bus; p. 135.
PR Newswire; Tuesday, Nov. 14, 1995; Entitled: ESS Technology Introduces First Single-Chip Audio Subsystem With Integrated music Synthesis and Full Windows 95 Plug and Play Support for Multi-Function Multimedia; pp. 1-3.
Gale Cengage Learning; USB and IEEE 1394: pretenders, contenders, or locks for ubiquitous desktop deployment? (Universal Serial Bus; IEEE 1934 FireWire) (includes related articles). Maury Wright. EDN 41.n9 (Apr. 25, 196): pp. 79(8).
PR Newswire; Monday, Jan. 16, 1995; New Media Names Director of Sales; Company Positions Itself for a Another Record Breaking Year; pp. 1 and 2.
News Bank, Inc.—Access World News; Author/Byline: John Dodge; Entitled: Peripheral Vision Gates's Goof Notwithstanding, Windows USB Port Harbors Hope; Boston Globe—Wednesday, Apr. 29, 1998; Edition: Third; Section: Business; p. C4.
Oxford Reference Online Premium; A Dictionary of Computing (Plug and Play).
Special Report: 32-bt Windows; Author: Emily Leinfuss: Entitled: Windows Plug and Play Still Holds More Promise Than Payoff—It's here and helpful, but continued lack of devices drivers means plenty of "Plug and Pray" for IS; pp. 1-6.
Business Wire; Wednesday, Nov. 30, 1994; Entitled: Intelligent PC Products Get Ready for Window 95; PC Product Lines Adapted for Full Plug and Play Benefits; pp. 1-2.
Business Wire; Wednesday, Nov. 2, 1994; Entitled: Sierra Unveils "Plug and Play" modem for ISA; New Auto Configuration Modem Supports Plug and Play Specification and Removes Setup Workload; pp. 1-2.
Windows® 95; Plug and Play White Paper; Dated: Aug. 1995; Compaq Computer Corporation Compaq the lead Systems Partner for Windows® 95; pp. 1-6.
Business Wire: Monday, Mar. 13, 1995; Adaptec I/O Solution First to Combine Bus Mastering and Plug and Play Technology; Industry-standard AHA-1540 Host Adapter Combines SCSI Performance and Compatibility With Plug and Play Simplicity; pp. 1-3.
SCSI Standard is Universal. (Small Computer Systems Interface) (Ask David Ramsey) (question-and-answer) (Column). David Ramsey. MacWEEK 7 .n.40 (Oct. 11, 1993): pp. 44(1).
ProQuest; Troubleshooting Tipe and Tools; Steinberg, Gene. Macworld. San Francisco: Apr. 1994. vol. 11, Iss. 4; p. 102, 5 Pages.
ProQuest—Memory Management for the Stand-Alone and Networked PC; Hannah, Stan A. Miller, Joseph B. Computers in Libriaries. Westport: Mar. 1995. Bol. 15, Iss. 3; p. 12.
A Full-Featured Pentium® PCI-Based Notebook Computer; Author: Timothy F. Myers; Hewlett-Packard Journal; Dated Jun. 1996, Article 5; pp. 1-8.
CD-ROM Drive F1197A for the HP OmniBook User's Guide; © Copyright Hewlett-Packard Company 1996; pp. 1-20.
Digital HiNote VP 500 Series User's Guide; Digital Equipment Corporation; Dated Jul. 1996; © Copyright Digital Equipment Corporation 1996; pp. 1-123.
Hard Drive: Seagate: ST51080N Medal 1080 1080 SCS12 Fast; Dated Mar. 27, 2009. pp. 1-13.
HP OmniBook 2000/5700 User's Guide (Windows 95); © Copyright Hewlett-Packard Company 1997; pp. 1-68.
HP OmniBook 5000 User's Guide; Edition 1; Dated Oct. 1995; pp. 1-101.
HP OmniBook 800 with MMX Technology; PC Magazine, Jan. 7, 1997; © Copyright Hewlett-Packard Company 1997.
HP OmniBook Accessories User's Guide; © Copyright Hewlett-Packard Company 1995-1996; pp. 1-39.
Quick Installation Guide; PCMCIA ATA Hard Drive; Simple Technology; Dated Dec. 1996. © Copyright 1996 Simple Technology Inc.; pp. 1-4.
Proprietary Notice and Liability Disclaimer; © Copyright 1995 NEC Technologies, Inc.; pp. 1-280.
SyQuest ezflyer™ 230MB; 230 MB Portable SCSI Removable Cartridge Hard Drive; Installation Guide for PC Compatible Systems © Copyright 1997 by SyQuest Technology; Index and pp. 1-35.
US Robotics the Intelligent Choice in Information Access User's Guide; Sportster Voice 33.600 and 28.800 Faxmodem; © Copyright 1996 by U. S. Robotics; Index and pp. 1-55.

(56) References Cited

OTHER PUBLICATIONS

Zip® 100™ Parallel Port Drive User's Manual; © Copyright © 2000; Iomega Corporation; Version 2.01—Dated Jun. 6, 2000; pp. 1-42.
Load-Date, May 25, 1997; © Copyright 1996—M2 Communications Ltd., 1 of 213 Documents; Oct. 1996.
R. A. Berkoff: IBM® Technical Disclosure Bulletin; vol. 37; No. 08; Aug. 1994; Entitled: Direct Access Storage Device/Small Computer Systems Interface Device Support for OS/2.
Gale Cengage Learning—PCNFS on Windows 95. (Net Worth) (Technology Information).Steven Baker. UNIX Review 15.n2 (Feb. 1997): pp. 13(5).(2109 words)p pp. 1-6.
*Desklab 216 User Manual*, Gradient Desklab User's Manual: 1992 (225 pgs).
*14-Bit, 2 MHZ A-to-D SCSI substation for the Most Demanding Data Acquision Applications*, Analogic the World Resource for Precision Signal Technology, Bulletin No. 16-100452 Rev 0 3/92 xM, 1992 (4 pgs).
*16-Bit Digital-to-Analog Converter Subsystem Attaches to Host SCSI Port*, Analogic the World Resource for Precision Signal Technology, Bulletin No. 16-100xxx Rev xx/92 xM, 1992, (3 pgs).
*SCSI Real-Time Video Frame Grabber 8-Bit Monochrome with up to 8 Mbytes Memory*, Analogic the World Resource for Precision Signal Technology, Bulletin No. 16-100424 Rev 2 2/92 2M, 1992 (4 pgs).
*16 & 18-Bit, Stereo A/D Converters for Digital Audio*, Crystal Semiconductor Corporation, Mar. '92, pp. 5-23.
Short, Kenneth L., *Microprocessors and Programmed Logic*, Library of Congress Cataloging in Publication Data, Prentice-Hall, Inc., 1981.
Francis et al., Principles of interfacing computers to medical equipment, Bailliere's Clinical Obstetrics and Gynaecology, vol. 4, No. 4, Dec. 1990, ISBN 0-7020-1479-6, pp. 787-795.
*Programmer's Technical Reference for MSDOS and the IBM PC*, http://www.o3one.org/hwdocs/bios_doc/dorsef22.html, pp. 1-213; Dave Williams, 1987, 1992.
Ridge, Peter M., *The Book of SCSI A Guide for Adventurers*, Library of Congress 1995 (436 pgs).
Lee et al., *A standardized Approach for Transducer Interfacing: Implementing IEEE-P1451 Smart Transducer Interface Draft Standards*, U.S. Department of Commerce, Oct. 1996 (34 pgs).
Duncan, Ray, *Advanced MSDOS the Microsoft guide for Assembly Language and C programmers*. Library of Congress Cataloging in Publication Data, Microsoft Press, 1986.
Johnson, Robert N., *Building Plug-and-Play Networked Smart Transducers*, Sensors Magazine, Oct. 1997, p. 1-19.
Bove et al., Cheops: *A Reconfigzirable Data-Flow System for Video Processing*, IEEE Transactions on Circuits and Systems for Video Technology, vol. 5, No. 2, Apr. 1995, pp. 140-149.
Bove et al., Cheops: *A Reconfigurable Data-Flow System for Video Processing*, IEEE Transactions on Circuits and Systems for Video Technology, 5, Apr. 1995.
*Common Communication Interfaces for Networked Smart Sensors and Actuators*, Sensors, Sep. 1995, pp. 14-23.
Conway et al., *IEEE 1451.2: An Interpretation and Example Implementation*, IEEE Xplore, 2000, pp. 535-541.
Miao, T., *IEEE 1451.2, A Network Independent Standard for Smart Transducers*, IEEE Xplore, 1998, pp. 1-4.
Spoelder, et al., *Real-time data-acquisition within a standard UNIX environment:Advantages of a divide-and-conquer strategy*, Instrumentation and Measurement Technology Conference, 1993, IMTC/93 Conference Record., IEEE, pp. 1-4.
Fischer et al., *The PICmirco MCU as an IEEE 1451.2 Compatible Smart Transducer Interface Module (STIM)*, Microchip Technology, Inc. 2000, pp. 1-63.
Lee, Kang, *The Proposed Smart Transducer Interface Standard*, IEEE Instrumentation and Measurement Technology Conference, 1998, pp. 129-135.
*Smart Transducer Module*, Telemonitor, Inc., Feb. 9, 2000.
Yu, Ross Anthony, *A Field Programmable Gate Array Based Stream Processor for the Cheops Imaging System*, Massachusetts Institute of Technology, 1996, pp. 82.
*Desklab, SCSI data colletion/analysis box*, http://gbppr.dyndns.org/10pht/blackcrwl/hamradio/voicecom/dspfaq2.txt, Sep. 1990, p. 1.
*Applied Computer Science Group—Multimodal Human Computer Interaction (SFB360)*, http://aiweb.techfak.uni-bielefeld.de/files/old-site/projects-perceptionprototype/welcome.html, 2010, pp. 1-2.
Muthusamy, Yeshwant Kumar, *A Segmental Approach to Automatic Language Identification*, A dissertation of the Oregon Graduate Institute of Science and Technology, 1993, pp. 1-309.
Kletzander, Arno, *Strange SCSI devices*, Studentische Hilfskraft Infromatick Sammlung Erlangen, 1983, p. 1.
*16-Bit Multimedia Audio Codex*, Crystal Semiconductor Corporation, 1993 pp. 1-53.
Cole et al., *Telephone Speech Corpus Development at CSLU*, ICSLP-94, 1994, pp. 1-4.
*Spontaneous Speech Translation in Multimedia Environment*, 1995, pp. 1-216.
*Tri/+Program Shippable Products Catalog*, Digital Equipment Corporation, 1992.
*Third Party Product Announcements*, The Florida SunFlash vol. 61, No. 2, 1994.
Ching, et al., *Development of a Large Vocabulary Speech Database for Cantonese*, IEEE, 1997, pp. 1775-1778.
Cooley et al., *DeskLab a SCSI-Based Teal-Time Data Acquisition Solution for UNIX & VMS Workstations*, IEEE Signal Processing Magazine, vol. 9, No. 1, 1992.
*New Products*, Computer 1991, pp. 76-78.
Kibrick et al., *CCD Data Acquisition Systems at Lick and Keck Observatories*, Astronomical Data Analysis Software and Systems II, ASP Conference Series, vol. 52, 1993, pp. 277-288.
*SAO/NASA ADS Astronomy Abstract Service*, CCD Data Acquisition Systems at Lick and Keck Observatories, 1993, pp. 1-2.
Wooters, Charles Clayton; *Lexical Modeling in a Speaker Independent Speech Understanding System*, International Computer Science Institute, 1993.
Saunders, John; *Real-time Discrimination of Broadcast Speech/Music*, Sanders, A Lockheed Martin Co., 1996 pp. 993-996.
Woods, Sam P., *The IEEE-P1451 Transducer to Microprocessor Interface*, Sensors, Jun. 1996, p. 43-47.

\* cited by examiner

ANALOG DATA GENERATING AND PROCESSING DEVICE HAVING A MULTI-USE AUTOMATIC PROCESSOR

CROSS-REFERENCE TO RELATED APPLICATIONS

This application is a continuation of application Ser. No. 11/078,778, filed Mar. 11, 2005, which is a continuation of application Ser. No. 10/219,105, filed Aug. 15, 2002, now U.S. Pat. No. 6,895,449, which is a divisional of application Ser. No. 09/331,002, filed Jun. 14, 1999, now U.S. Pat. No. 6,470,399.

FIELD OF THE INVENTION

The present invention relates to the transfer of data and in particular to interface devices for communication between a computer or host device and a data transmit/receive device from which data is to be acquired or with which two-way communication is to take place.

BACKGROUND OF THE INVENTION

Existing data acquisition systems for computers are very limited in their areas of application. Generally such systems can be classified into two groups.

In the first group host devices or computer systems are attached by means of an interface to a device whose data is to be acquired. The interfaces of this group are normally standard interfaces which, with specific driver software, can be used with a variety of host systems. An advantage of such interfaces is that they are largely independent of the host device. However, a disadvantage is that they generally require very sophisticated drivers which are prone to malfunction and which limit data transfer rates between the device connected to the interface and the host device and vice versa. Further, it is often very difficult to implement such interfaces for portable systems and they offer few possibilities for adaptation with the result that such systems offer little flexibility.

The devices from which data is to be acquired cover the entire electrical engineering spectrum. In a typical case, it is assumed that a customer who operates, for example, a diagnostic radiology system in a medical engineering environment reports a fault. A field service technician of the system manufacturer visits the customer and reads system log files generated by the diagnostic radiology system by means a portable computer or laptop for example. If the fault cannot be localized or if the fault is intermittent, it will be necessary for the service technician to read not only an error log file but also data from current operation. It is apparent that in this case fast data transfer and rapid data analysis are necessary.

Another case requiring the use of an interface could be, for example, when an electronic measuring device, e.g. a multimeter, is attached to a computer system to transfer the data measured by the multimeter to the computer. Particularly when long-term measurements or large volumes of data are involved is it necessary for the interface to support a high data transfer rate.

From these randomly chosen examples it can be seen that an interface may be put to totally different uses. It is therefore desirable that an interface be sufficiently flexible to permit attachment of very different electrical or electronic systems to a host device by means of the interface. To prevent operator error, it is also desirable that a service technician is not required to operate different interfaces in different ways for different applications but that, if possible, a universal method of operating the interface be provided for a large number of applications.

To increase the data transfer rates across an interface, the route chosen in the second group of data acquisition systems for the interface devices was to specifically match the interface very closely to individual host systems or computer systems. The advantage of this solution is that high data transfer rates are possible. However, a disadvantage is that the drivers for the interfaces of the second group are very closely matched to a single host system with the result that they generally cannot be used with other host systems or their use is very ineffective. Further, such types of interface have the disadvantage that they must be installed inside the computer casing to achieve maximum data transfer rates as they access the internal host bus system. They are therefore generally not suitable for portable host systems in the form of laptops whose minimum possible size leaves little internal space to plug in an interface card.

A solution to this problem is offered by the interface devices of IOtech (business address: 25971 Cannon Road, Cleveland, Ohio 44146, USA) which are suitable for laptops such as the WaveBook/512 (registered trademark). The interface devices are connected by means of a plug-in card, approximately the size of a credit card, to the personal computer memory card association (PCMIA) interface which is now a standard feature in laptops. The plug-in card converts the PCMCIA interface into an interface known in the art as Institute of Electrical and Electronics (IEEE) 1284. The said plug-in card provides a special printer interface which is enhanced as regards the data transfer rate and delivers a data transfer rate of approximately 2 MBps as compared with a rate of approx. 1 MBps for known printer interfaces. The known interface device generally consists of a driver component, a digital signal processor, a buffer and a hardware module which terminates in a connector to which the device whose data is to be acquired is attached. The driver component is attached directly to the enhanced printer interface thus permitting the known interface device to establish a connection between a computer and the device whose data is to be acquired.

In order to work with the said interface, an interface-specific driver must be installed on the host device so that the host device can communicate with the digital signal processor of the interface card. As described above, the driver must be installed on the host device. If the driver is a driver developed specifically for the host device, a high data transfer rate is achieved but the driver cannot be easily installed on a different host system. However, if the driver is a general driver which is as flexible as possible and which can be used on many host devices, compromises must be accepted with regard to the data transfer rate.

Particularly in an application for multi-tasking systems in which several different tasks such as data acquisition, data display and editing are to be performed quasi-simultaneously, each task is normally assigned a certain priority by the host system. A driver supporting a special task requests the central processing system of the host device for processor resources in order to perform its task. Depending on the particular priority assignment method and on the driver implementation, a particular share of processor resources is assigned to a special task in particular time slots. Conflicts arise if one or more drivers are implemented in such a way that they have the highest priority by default, i.e. they are incompatible, as happens in practice in many applications. It may occur that both drivers are set to highest priority which, in the worst case, can result in a system crash.

EP 0685799 A1 discloses an interface by means of which several peripheral devices can be attached to a bus. An interface is connected between the bus of a host device and various peripheral devices. The interface comprises a finite state machine and several branches each of which is assigned to a peripheral device. Each branch comprises a data manager, cycle control, user logic and a buffer. This known interface device provides optimal matching between a host device and a specific peripheral device.

The specialist publication IBM Technical Disclosure Bulletin, Vol. 38, No. 05, page 245; "Communication Method between Devices through FDD Interface" discloses an interface which connects a host device to a peripheral device via a floppy disk drive interface. The interface consists in particular of an address generator, a modified frequency modulation (MFM) encoder/decoder, a serial/parallel adapter and a format signal generator. The interface makes it possible to attach not only a floppy disk drive (FDD) but also a further peripheral device to the FDD host controller of a host device. The host device assumes that a floppy disk drive is always attached to its floppy disk drive controller and communication is initiated if the address is correct. However, this document contains no information as to how communication should be possible if the interface is connected to a multi-purpose interface instead of to a floppy disk drive controller.

SUMMARY OF THE INVENTION

It is the object of the present invention to provide an interface device for communication between a host device and a data transmit/receive device whose use is host device-independent and which delivers a high data transfer rate.

The present invention is based on the finding that both a high data transfer rate and host device-independent use can be achieved if a driver for an input/output device customary in a host device, normally present in most commercially available host devices, is utilized. Drivers for input/output devices customary in a host device which are found in practically all host devices are, for example, drivers for hard disks, for graphics devices or for printer devices. As however the hard disk interfaces in common host devices which can be, for example, IBM personal computers (PCs), IBM-compatible PCs, Commodore PCs, Apple computers or even workstations, are the interfaces with the highest data transfer rate, the hard disk driver is utilized in the preferred embodiment of the interface device of the present invention. Drivers for other storage devices such as floppy disk drives, compact disk read-only memory (CD-ROM) drives or tape drives could also be utilized in order to implement the interface device according to the present invention.

As described in the following, the interface device according to the present invention is to be attached to a host device by means of a multi-purpose interface of the host device which can be implemented, for example, as a small computer systems interface (SCSI) interface or as an enhanced printer interface. Multi-purpose interfaces comprise both an interface card and specific driver software for the interface card. The driver software can be designed so that it can replace the basic input/output system (BIOS) driver routines. Communication between the host device and the devices attached to the multi-purpose interface then essentially takes place by means of the specific driver software for the multi-purpose interface and no longer primarily by means of BIOS routines of the host device. Recently however drivers for multi-purpose interfaces can also already be integrated in the BIOS system of the host device as, alongside classical input/output interfaces, multi-purpose interfaces are becoming increasingly common in host devices. It is of course also possible to use BIOS routines in parallel with the specific driver software for the multi-purpose interface, if this is desired.

The interface device according to the present invention comprises a processor means, a memory means, a first connecting device for interfacing the host device with the interface device, and a second connecting device for interfacing the interface device with the data transmit/receive device. The interface device is configured by the processor means and the memory means in such a way that the interface device, when receiving an inquiry from the host device via the first connecting device as to the type of a device attached to the host device, sends a signal, regardless of the type of the data transmit/receive device, to the host device via the first connecting device which signals to the host device that it is communicating with an input/output device. The interface device according to the present invention therefore simulates, both in terms of hardware and software, the way in which a conventional input/output device functions, preferably that of a hard disk drive. As support for hard disks is implemented as standard in all commercially available host systems, the simulation of a hard disk, for example, can provide host device-independent use. The interface device according to the present invention therefore no longer communicates with the host device or computer by means of a specially designed driver but by means of a program which is present in the BIOS system (Basic Input/Output System) and is normally precisely matched to the specific computer system on which it is installed, or by means of a specific program for the multi-purpose interface. Consequently, the interface device according to the present invention combines the advantages of both groups. On the one hand, communication between the computer and the interface takes place by means of a host device-specific BIOS program or by means of a driver program which is matched to the multi-purpose interface and which could be regarded as a "device-specific driver". On the other hand, the BIOS program or a corresponding multi-purpose interface program which operates one of the common input/output interfaces in host systems is therefore present in all host systems so that the interface device according to the present invention is host device-independent.

BRIEF DESCRIPTION OF THE DRAWINGS

In the following, preferred embodiments of the present invention will be explained in more detail with reference to the drawings enclosed, in which.

DETAILED DESCRIPTION OF THE PREFERRED EMBODIMENTS

It should be understood that the title of this section of this specification, namely, "Detailed Description Of The Invention", relates to a requirement of the United States Patent Office, and does not imply, nor should be inferred to limit the subject matter disclosed herein.

Figure 1:
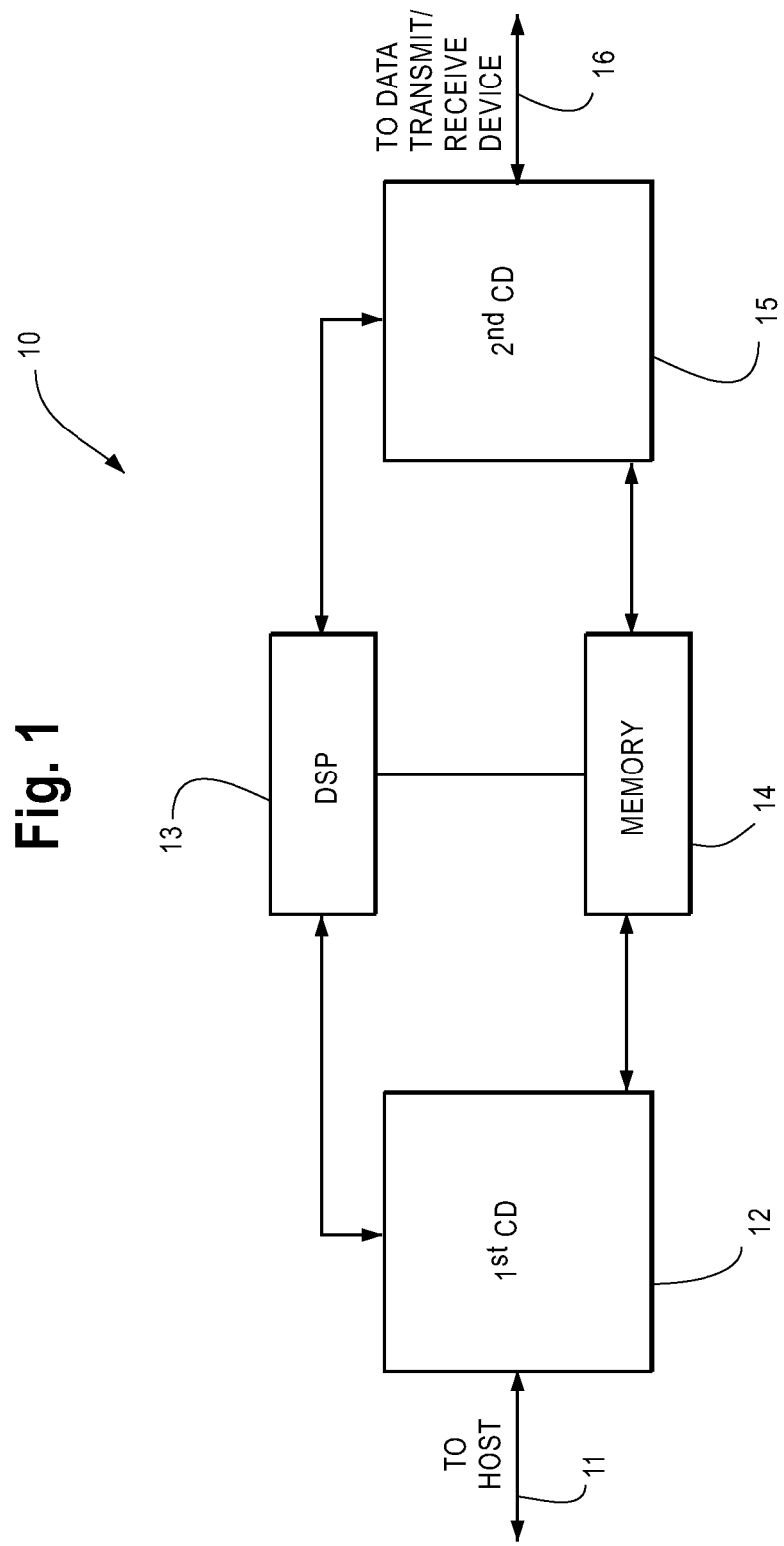
FIG. 1 shows a general block diagram of the interface device according to the present invention.

FIG. 1 shows a general block diagram of an interface device 10 according to the present invention. A first connecting device 12 of the interface device 10 can be attached to a host device (not shown) via a host line 11. The first connecting device is attached both to a digital signal processor 13 and to a memory means 14. The digital signal processor 13 and the memory means 14 are also attached to a second connecting device 15 by means of bi-directional communication lines (shown for all lines by means of two directional arrows). The second connecting device can be attached by means of an output line 16 to a data transmit/receive device which is to receive data from the host device or from which data is to be read, i.e. acquired, and transferred to the host device. The data transmit/receive device itself can also communicate actively with the host device via the first and second connecting device, as described in more detail in the following.

Communication between the host system or host device and the interface device is based on known standard access commands as supported by all known operating systems (e.g. DOS®, Windows®, Unix®). Preferably, the interface device according to the present invention simulates a hard disk with a root directory whose entries are "virtual" files which can be created for the most varied functions. When the host device system with which the interface device according to the present invention is connected is booted and a data transmit/receive device is also attached to the interface device 10, usual BIOS routines or multi-purpose interface programs issue an instruction, known by those skilled in the art as the INQUIRY instruction, to the input/output interfaces in the host device. The digital signal processor 13 receives this inquiry instruction via the first connecting device and generates a signal which is sent to the host device (not shown) again via the first connecting device 12 and the host line 11. This signal indicates to the host device that, for example, a hard disk drive is attached at the interface to which the INQUIRY instruction was sent. Optionally, the host device can send an instruction, known by those skilled in the art as "Test Unit Ready", to the interface device to request more precise details regarding the queried device.

Regardless of which data transmit/receive device at the output line 16 is attached to the second connecting device, the digital signal processor 13 informs the host device that it is communicating with a hard disk drive. If the host device receives the response that a drive is present, it then sends a request to the interface device 10 to read the boot sequence which, on actual hard disks, normally resides on the first sectors of the disk. The digital signal processor 13, whose operating system in stored in the memory means 14, responds to this instruction by sending to the host device a virtual boot sequence which, in the case of actual drives, includes the drive type, the starting position and the length of the file allocation table (FAT), the number of sectors, etc., known to those skilled in the art. Once the host device has received this data, it assumes that the interface device 10 according to a preferred embodiment of the present invention is a hard disk drive. In reply to an instruction from the host device to display the directory of the "virtual" hard disk drive simulated by the interface device 10 with respect to the host device, the digital signal processor can respond to the host device in exactly the same way as a conventional hard disk would, namely by reading on request the file allocation table or FAT on a sector specified in the boot sequence, normally the first writable sector, and transferring it to the host device, and subsequently by transferring the directory structure of the virtual hard disk. Further, it is possible that the FAT is not read until immediately prior to reading or storing the data of the "virtual" hard disk and not already at initialization.

In a preferred embodiment of the present invention, the digital signal processor 13, which need not necessarily be implemented as a digital signal processor but may be any other kind of microprocessor, comprises a first and a second command interpreter. The first command interpreter carries out the steps described above whilst the second command interpreter carries out the read/write assignment to specific functions. If the user now wishes to read data from the data transmit/receive device via the line 16, the host device sends a command, for example "read file xy", to the interface device. As described above, the interface device appears to the host device as a hard disk. The second command interpreter of the digital signal processor now interprets the read command of the host processor as a data transfer command, by decoding whether "xy" denotes, for example, a "real-time input" file, a "configuration" file or an executable file, whereby the same begins to transfer data from the data transmit/receive device via the second connecting device to the first connecting device and via the line 11 to the host device.

Preferably, the volume of data to be acquired by a data transmit/receive device is specified in a configuration file described in the following by the user specifying in the said configuration file that a measurement is to last, for example, five minutes. To the host device the "real-time input" file then appears as a file whose length corresponds to the anticipated volume of data in those five minutes. Those skilled in the art know that communication between a processor and a hard disk consists of the processor transferring to the hard disk the numbers of the blocks or clusters or sectors whose contents it wishes to read. By reference to the FAT the processor knows which information is contained in which block. In this case, communication between the host device and the interface device according to the present invention therefore consists of the very fast transfer of block numbers and preferably of block number ranges because a virtual "real-time input" file will not be fragmented. If the host device now wants to read the "real-time input" file, it transfers a range of block numbers to the interface device, whereupon data commences to be received via the second connecting device and data commences to be sent to the host device via the first connecting device.

In addition to the digital signal processor instruction memory, which comprises the operating system of the digital signal processor and can be implemented as an erasable programmable read-only memory (EPROM) or electrically erasable programmable read-only memory (EEPROM), the memory means 14 can have an additional buffer for purposes of synchronizing data transfer from the data transmit/receive device to the interface device 10 and data transfer from the interface device 10 to the host device.

Preferably, the buffer is implemented as a fast random access memory or random access memory (RAM) buffer.

Further, from the host device the user can also create a configuration file, whose entries automatically set and control various functions of the interface device 10, on the interface device 10 which appears to the host device as a hard disk. These settings can be, for example, gain, multiplex or sampling rate settings. By creating and editing a configuration file, normally a text file which is simple to understand with little prior knowledge, users of the interface device 10 are able to perform essentially identical operator actions for almost any data transmit/receive devices which can be attached to the second connecting device via the line 16, thus eliminating a source of error arising from users having to know many different command codes for different applications. In the case of the interface device 10 according to the present invention it is necessary for users to note the conventions of the configuration file once only in order to be able to use the interface device 10 as an interface between a host device and almost any data transmit/receive device.

As a result of the option of storing any files in agreed formats in the memory means 14 of the interface device 10, taking into account the maximum capacity of the memory means, any enhancements or even completely new functions of the interface device 10 can be quickly implemented. Even files executable by the host device, such as batch files or executable files (BAT or EXE files), and also help files can be implemented in the interface device, thus achieving independence of the interface device 10 from any additional software (with the exception of the BIOS routines) of the host device. On the one hand, this avoids licensing and/or registration problems and, on the other hand, installation of certain routines which can be frequently used, for example an fast Fourier transformation (FFT) routine to examine acquired time-domain data in the frequency domain, is rendered unnecessary as the EXE files are already installed on the interface device 10 and appear in the virtual root directory, by means of which the host device can access all programs stored on the interface device 10.

In a preferred embodiment of the present invention in which the interface device 10 simulates a hard disk to the host device, the interface device is automatically detected and readied for operation when the host system is powered up or booted. This corresponds to the plug-and-play standard which is currently finding increasingly widespread use. The user is no longer responsible for installing the interface device 10 on the host device by means of specific drivers which must also be loaded; instead the interface device 10 is automatically readied for operation when the host system is booted.

For persons skilled in the art it is however obvious that the interface device 10 is not necessarily signed on when the computer system is powered up but that a special BIOS routine or a driver for a multi-purpose interface can also be started on the host device during current operation of the computer system in order to sign on or mount the interface device 10 as an additional hard disk. This embodiment is suitable for larger workstation systems which are essentially never powered down as they perform, e.g. mail functions or monitor processes which run continuously, for example, in multi-tasking environments.

In the interface device according to the present invention an enormous advantage is to be gained, as apparent in the embodiment described in the following, in separating the actual hardware required to attach the interface device 10 to the data transmit/receive device from the communication unit, which is implemented by the digital signal processor 13, the memory means 14 and the first connecting device 12, as this allows a plurality of dissimilar device types to be operated in parallel in identical manner. Accordingly, many interface devices 10 can be connected to a host device which then sees many different "virtual" hard disks. In addition, any modification of the specific hardware symbolized by the second connecting device 15 can be implemented essentially without changing the operation of the interface device according to the present invention. Further, an experienced user can intervene at any time on any level of the existing second connecting device by making use of the above mentioned option of creating a configuration file or adding or storing new program sections for the second connecting device.

An important advantage of the interface device 10 of the present invention is that it also permits extremely high data transfer rates by using, for data interchange, the host device-own BIOS routines which are optimized for each host device by the host device manufacturer or BIOS system manufacturer, or by using driver programs which are normally optimized and included by the manufacturers of multi-purpose interfaces. Furthermore, due to the simulation of a virtual mass storage device, the data is managed and made available in such a way that it can be transferred directly to other storage media, e.g. to an actual hard disk of the host device without, as it were, intervention of the host device processor. The only limitation to long-term data transfer at high speed is therefore imposed exclusively by the speed and the size of the mass storage device of the host device. This is the case as the digital signal processor 13 already formats the data read by the data transmit/receive device via the second connecting device 15 into block sizes suitable for a hard disk of the host device, whereby the data transfer speed is limited only by the mechanical latency of the hard disk system of the host device. At this point, it should be noted that normally data flow from a host device must be formatted in blocks to permit writing to a hard disk and subsequent reading from a hard disk, as known by those skilled in the art.

The said data transfer rate can be increased further by setting up a direct memory access (DMA) or RAM drive in the host system. As those skilled in the art know, the setting up of a RAM drive requires processor resources of the host device, with the result that the advantage of writing the data to a hard disk drive of the host device essentially without the need for processor resources is lost.

As described above, a data buffer can be implemented in the memory means 14 to permit independence in terms of time of the data transmit/receive device attached to the second connecting device from the host device attached to the first connecting device. This guarantees error-free operation of the interface device 10 even for time-critical applications in multi-tasking host systems.

Figure 2:
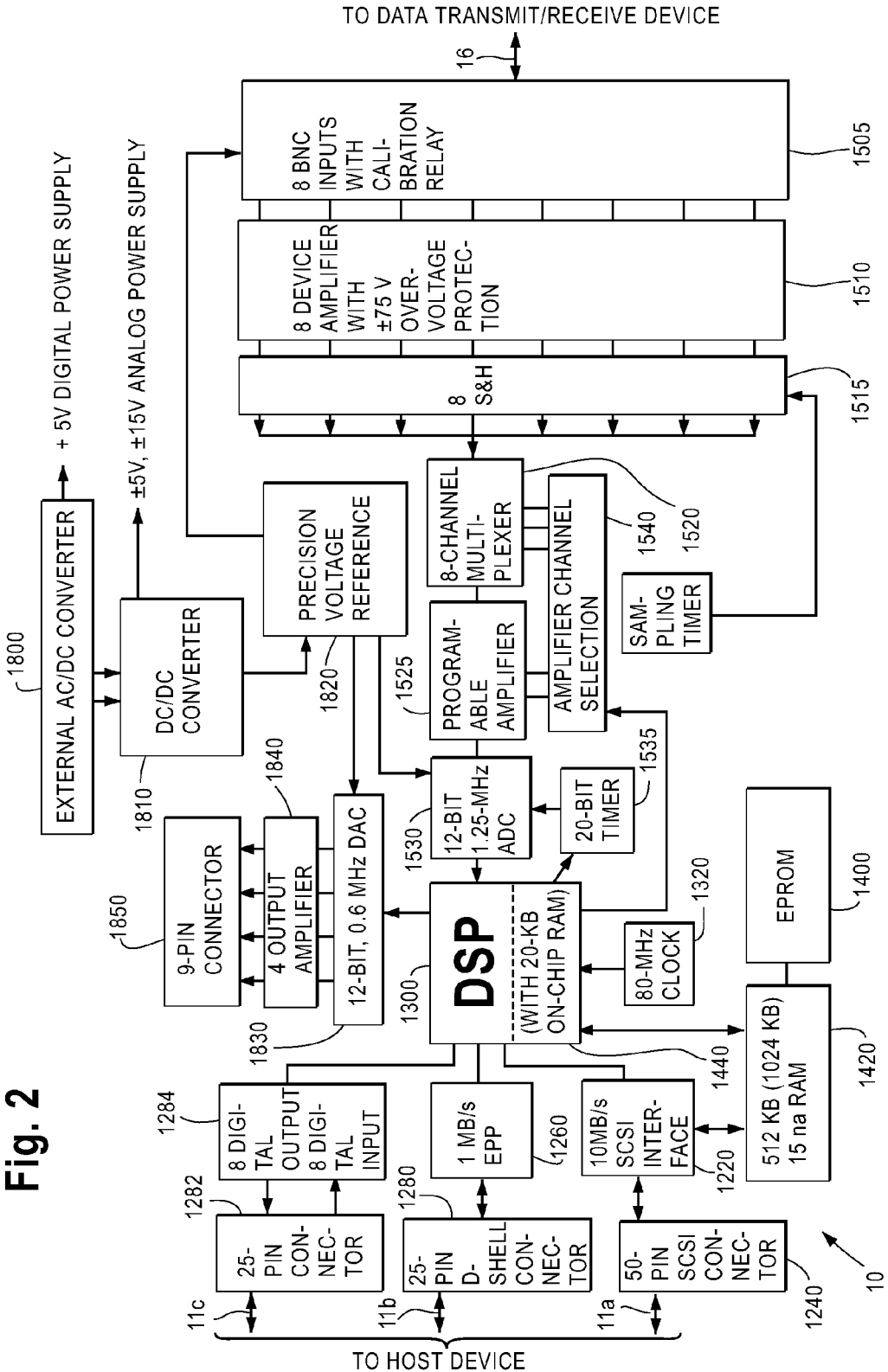
FIG. 2 shows a detailed block diagram of an interface device according to a preferred embodiment of the present invention.

FIG. 2 shows a detailed block diagram of an interface device 10 according to the present invention.

A digital signal processor (DSP) 1300 is, in a manner of speaking, the heart of the interface device 10. The DSP can be any DSP but preferably has a 20-MB on-chip random access memory (RAM). Certain instruction sets, for example, can be stored in the RAM already integrated in the DSP. An 80-MHz clock generator is attached to the DSP 1300 in order to synchronize the DSP. The DSP implements a fast Fourier transformation (FFT) in real time and also optional data compression of the data to be transferred from the data transmit/receive device to the host device in order to achieve greater efficiency and to permit interoperation with host devices which have a smaller memory.

In the preferred embodiment of the interface device 10 shown in FIG. 2, the first connecting device 12 of FIG. 1 contains the following components: an SCSI interface 1220 and a 50-pin SCSI connector 1240 for attachment to an SCSI interface present on most host devices or laptops. The SCSI (small computer system interface) interface 1220 translates the data received via the SCSI connector 1240 into data understood by the DSP 1300, as known by those skilled in the art. Further, the first connecting device 12 comprises an EPP (enhanced parallel port) with a data transfer rate of approx. 1 MBps which delivers a more moderate data transfer rate of 1 MBps by comparison to the data transfer rate of 10 MBps of the SCSI interface. The EPP 1260 is connected to a 25-pin D-shell connector 1280 to permit attachment to a printer interface of a host device for example. Optionally, the first connecting device 12 also comprises a 25-pin connector 1282 which permits the attachment of 8 digital outputs and 8 digital inputs 1284 at a host device.

Preferably, the second connecting device comprises 8 BNC inputs with the calibration relay 1505, a block 1510 with 8 device amplifiers with an overvoltage protection of .+−.75 V, this block being connected in turn to 8 sample/hold (S&H) circuits 1515. The calibration relays are relays which permit controlled changeover between a test voltage and a calibration reference voltage. Each sample/hold circuit is connected to a corresponding input of an 8-channel multiplexer 1520 which feeds its output signals via a programmable amplifier 1525 into an analog/digital converter (ADC) with 12 bit and 1.25 MHz 1530 and to the DSP 1300. The ADC 1530 is controlled by means of a 20-bit timer 1535, as known by persons skilled in the art. The programmable amplifier 1525 and the 8-channel multiplexer 1520 are controlled via an amplifier channel selection circuit 1540 which is in turn controlled by the DSP 1300.

The complete interface device 10 is supplied with power by an external alternating current to direct current (AC/DC) converter 2230 which delivers a digital supply voltage of .+−.5 V and is attached to a direct current to direct current (DC/DC) converter 2240 which can deliver analog supply voltages of .+−.5 V and .+−.15 V as required for the interface device 10. Further, the direct current to direct current (DC/DC) converter controls a precision voltage reference 2250 which controls the 8 Bayonet Neill Concelman (BNC) inputs 1505 and the ADC 1530 as well as a digital/analog converter (DAC) 2260 which permits, via an output amplifier block with 4 output amplifiers 2270 and a 9-pin connector 2280, analog output direct from the DSP 1300 to an output device, e.g. printer device or monitor device, which can be attached via the 9-pin connector 2280, thus providing the option of monitoring the data transferred to the host device or also, for example, of viewing an FFT to obtain rapid and comprehensive data analysis without using processor time of the host device.

In FIG. 2 the memory means 14 of FIG. 1 is implemented by an EPROM 1400 which, in a preferred embodiment of the present invention, contains the operating system of the digital signal processor 1300. A random access memory with an access time of 15 ns and a size of 512 KB or optionally 1024 KB 1420 serves as a data buffer to achieve independence in terms of time of the output line 16 from the output lines 11a, 11b and 11c to the data transmit/receive device and to the host device respectively. As described above, in a preferred embodiment of the present invention the digital signal processor 1300 already contains a 20-KB on-chip RAM 1440 which can store certain instruction sets, functions and also smaller application software units.

The connection, symbolized by the line 16, of the interface device 10 to any data transmit/receive device implements, by means of the blocks 1505-1535, an analog input with a sampling rate of 1.25 MHz and quantization of 12 bits. There are 8 channels with an overvoltage protection of .+−.75 V. By means of the programmable amplifier 1525 the channels can be programmed independently of each other in voltage ranges up to a maximum of .+−.10 V. Unused channels can be grounded internally to reduce channel intermodulation. The block 1515 is implemented as a monolithic high-precision, high-speed sample/hold amplifier for simultaneous sampling of all channels. The precision voltage reference 1820 provides a high-precision, temperature-compensated monolithic energy gap voltage reference for auto-calibration of each channel and each gain. Further, offset fine adjustment for each channel is implemented by the same.

The blocks 1830, 1840 and 1850 implement a direct analog output for the digital signal processor 1300, and the DAC 1830 provides a data transfer rate of 625 kHz and a quantization of 12 bits. The block 1840 comprises 4 channels with a common output latch.

Further, the interface device 10 comprises a digital input/output device implemented by the blocks 1284 and 1282. Here there are 8 digital inputs, 8 digital outputs with a common latch, and the digital port can be attached preferably to a side panel of the interface device 10 so that the port itself can easily be accessed.

The digital signal processor 1300 provides on-board digital data processing. In particular, it is a high-performance DSP with a clock speed of 80 MHz and a 20-bit timer 1535.

As described above, the first connecting device 12 comprises the SCSI interface 1220 with a peak transfer rate of 10 MBps. An optional PCMCIA-to-SCSI adapter permits high-speed communication with laptop computers which are desirable and in widespread use, particularly by mobile service technicians. The EPP 1260 with its associated connector 1280 permits data transfer at a more moderate rate.

As described above, the interface device 10 is supplied with power by means of an external AC/DC adapter which has a universal power input (85-264 VAC, 47-63 Hz). Interference suppression complies with the standards EN 55022, curve B and FFC, Class B. Further, it is also in accordance with international safety regulations. TuV (Technischer Überwachongsverein), UL (Underwriters Laboratories), CSA (Canadian Standard Association). The interface device 10 is externally shielded and achieves a value of 55 dB at 30-60 MHz and a value of approximately 40 dB at 1 GHz, and therefore complies with the military standards (MILSTD) 285-1 standard.

As described above, communication between the host device and the multi-purpose interface can take place not only via drivers for input/output device customary in a host device which reside in the BIOS system of the host device but also via specific interface drivers which, in the case of SCSI interfaces, are known as multi-purpose interface ASPI (advanced SCSI programming interface) drivers. This ASPI driver, which can also be referred to as an ASPI manager, is specific to a special SCSI host adapter, i.e. to a special multi-purpose interface, and is normally included by the manufacturer of the multi-purpose interface. Generally speaking, this multi-purpose interface driver has the task of moving precisely specified SCSI commands from the host system program to the host system SCSI adapter. For this reason, the command set is almost identical to that of the SCSI interface itself. Essentially, only status and reset commands for the host adapter have been added.

The ASPI driver can be used if the hard disk was not already addressable at boot time or if the SCSI-related BIOS routines of the host computer were still disabled. Here too, the steps needed to initialize the interface device, preferably as a virtual hard disk, are similar to the steps taken when initializing at boot time.

In general terms, the ASPI manager comprises two sides. One side is the proprietary, hardware-oriented side. It is responsible for converting all commands into a form required by the corresponding multi-purpose interface. The hardware-oriented side of the ASPI driver is therefore matched to a very specific type of multi-purpose interface or SCSI interface. The other side is known as the user software side. This side is totally independent of the proprietary operating characteristics of the SCSI adapter and is therefore identical for all SCSI interfaces. This permits SCSI programming which is however independent of the individual SCSI adapter types.

In contrast to communication between the host device and the interface device according to the present invention on the basis of a BIOS driver, the use of such an ASPI driver for communication between the host device and the interface device according to the present invention allows various further possibilities of the SCSI multi-purpose interface to be exploited. In the case described above, the interface device which preferably signs on and behaves as a virtual hard disk is detected by the BIOS driver of the host computer at boot time and is configured as a hard disk. This step does not however support active requests sent by the interface device to the host computer. If however the virtual hard disk wishes to write data actively to, for example, a hard disk of the host computer or wishes to initiate communication with the processor of the host computer, the host computer must recognize the request of the virtual hard disk and tolerate a further issuer of instructions on its bus. If the interface device behaves solely like a virtual hard disk, it would always receive and never issue commands. The BIOS has no objections to an additional issuer of commands that actively wishes to place data on the bus of the host device but the BIOS does not support the host device in recognizing corresponding requests of the interface device or in granting the interface device permission to access the bus.

Using the ASPI manager the interface device according to the present invention can now obtain active access to an SCSI hard disk of the host device connected to the same SCSI bus which, in contrast to the interface device, cannot be a virtual but a real SCSI mass storage device or also a further interface device according to the present invention. Thereupon, the interface device according to the present invention can write the desired data to the SCSI hard disk of the host computer totally independently of the host computer or can communicate with the same in some other manner. The interface device according to the present invention therefore initially behaves passively as a virtual hard disk and then, as required and using the driver software for the multi-purpose interface, actively on the same SCSI bus. This means however that the interface device according to the present invention, using a driver software for the multi-purpose interface which comprises the BIOS routines customary in host devices and simultaneously provides the option of active participation, can, regardless of the type of the data transmit/receive device attached to the second connecting device, behave initially as a virtual and at the same time passive hard disk but can, as required, participate actively on the bus so as to be able to initiate communication directly with other SCSI hard disks of the host device by bypassing the processor of the host device.

Using a standard interface of a host device, the interface device according to the present invention permits communication with any host device. By simulating an input/output device to the host device and, in a preferred embodiment, by simulating a virtual mass storage device, the interface device 10 is automatically supported by all known host systems without any additional sophisticated driver software. The simulation of a freely definable file structure on the "virtual" hard disk provides simple operation and expansion options and, through the implementation of any programs, independence from special software implemented on the host device. Help files included on the interface device 10 and plug-and-play support ensure ease of use even in portable, flexible host devices. Despite the very simple user interface, experienced users are free at any time to intervene in the functions of the interface device 10 on system level. The interface device 10 thus provides a universal solution which can cover the entire spectrum of possible data transmit/receive devices.

What is claimed is:

1. An analog data generating and processing device (ADGPD), comprising:
    an input/output (i/o) port;
    a program memory;
    a data storage memory;
    a sensor designed to transmit data;
    a processor operatively interfaced with the i/o port, the program memory, the data storage memory and the sensor;
    wherein the processor is adapted to be involved in a data generation process by which the sensor generates analog data, the analog data is processed, and the processed analog data is stored in the data storage memory as at least one file of digitized analog data;
    wherein the processor also is adapted to be involved in an automatic recognition process in which, when the i/o port is operatively interfaced with a multi-purpose interface of a computer, the processor executes at least one instruction set stored in the program memory and thereby causes at least one parameter which provides identification information regarding the ADGPD to be automatically sent through the i/o port and to the multi-purpose interface of the computer (a) without requiring any end user to load any software onto the computer at any time, (b) without requiring any end user to interact with the computer to set up a file system in the ADGPD at any time, (c) before a time when the computer is able to receive the at least one file of digitized analog data from the data storage memory and (d) regardless of the identity of a manufacturer of the computer, wherein the at least one parameter is consistent with the ADGPD being responsive to commands issued from a customary driver;
    wherein the processor is further adapted to be involved in an automatic file transfer process in which, when the i/o port is operatively interfaced with the multi-purpose interface of the computer, and after the at least one parameter has been received by the multi-purpose interface of the computer, the processor executes at least one other instruction set stored in the program memory and thereby causes the at least one file of digitized analog data to be transferred to the computer regardless of the identity of the manufacturer of the computer and without requiring any user-loaded file transfer enabling software to be loaded on or installed in the computer at any time.

2. The ADGPD of claim 1, wherein the i/o port, the program memory, the data storage memory, and the processor form an interface device that is designed to have the analog data transferred to it from the sensor.

3. The ADGPD of claim 2, wherein the interface device comprises a portable interface device.

4. The ADGPD of claim 2, wherein the interface device comprises a flexible interface device.

5. The ADGPD of claim 2, wherein the interface device comprises a universal interface device.

6. The ADGPD of claim 2, wherein the interface device comprises a stand alone interface device.

7. The ADGPD of claim 2, wherein the interface device includes a parallel logic circuit.

8. The ADGPD of claim 2, wherein the interface device includes a SCSI interface circuit.

9. The ADGPD of claim 2, wherein the interface device is designed so that the sensor is detachable from the interface device.

10. The ADGPD of claim 2, wherein the interface device allows for a plurality of different data transmit devices to be attached thereto and detached therefrom.

11. The ADGPD of claim 2, wherein the sensor is designed to be readily disconnected from the interface device.

12. The ADGPD of claim 2, wherein the interface device is designed so that a user can attach the sensor to or detach the sensor from the interface device.

13. The ADGPD of claim 1, wherein the i/o port comprises a parallel port.

14. The ADGPD of claim 1, wherein the i/o port comprises a SCSI connector.

15. The ADGPD of claim 1, wherein the i/o port is adapted to be interfaced with a multi-purpose interface of an external computing device only by means of a cable.

16. The ADGPD of claim 1, wherein the i/o port is adapted to be physically connected to a multi-purpose interface of an external computing device by a cable.

17. The ADGPD of claim 1, wherein the sensor comprises a data transmit/receive device.

18. The ADGPD of claim 17, wherein the data transmit/receive device is designed for two-way communication with a host device.

19. The ADGPD of claim 17, wherein the data transmit/receive device is designed for one-way or two-way communication with a host device.

20. The ADGPD of claim 17, wherein the data transmit/receive device is designed to receive data from a host device.

21. The ADGPD of claim 1, wherein the processor is designed so that the sensor is detachable therefrom.

22. The ADGPD of claim 1, wherein the processor allows for a plurality of different data transmit devices to be attached thereto and detached therefrom.

23. The ADGPD of claim 1, wherein the sensor is designed to be readily disconnected from the processor.

24. The ADGPD of claim 1, wherein the processor is designed so that a user can attach the sensor to or detach the sensor therefrom.

25. The ADGPD of claim 1, wherein the sensor comprises a multimeter.

26. The ADGPD of claim 1, wherein the sensor includes at least first and second transducers both of which are designed to transmit data.

27. The ADGPD of claim 1, wherein the at least one parameter is consistent with the ADGPD being an information storage device other than a magnetic floppy disk drive.

28. The ADGPD of claim 1, wherein the at least one parameter is consistent with the ADGPD being a mass storage device.

29. The ADGPD of claim 1, wherein the at least one parameter is consistent with the ADGPD being responsive to a SCSI inquiry command.

30. The ADGPD of claim 1, wherein the at least one parameter is not consistent with the true nature of the ADGPD.

31. The ADGPD of claim 1, wherein the at least one parameter does not indicate that the ADGPD includes the sensor.

32. The ADGPD of claim 1, wherein the at least one parameter is consistent with the ADGPD being an input/output device.

33. The ADGPD of claim 1, wherein the at least one parameter is consistent with the ADGPD being an input/output device located within an interior of a housing of a personal computing device.

34. The ADGPD of claim 1, wherein the at least one parameter is consistent with the ADGPD being adapted to operate in a manner consistent with a hard disk drive.

35. The ADGPD of claim 1, wherein the at least one parameter is consistent with the ADGPD being a hard disk drive.

36. The ADGPD of claim 1, wherein the at least one parameter is consistent with the ADGPD being an input/output device that is customary in a host device.

37. The ADGPD of claim 1, wherein the data storage memory comprises a temporary memory.

38. The ADGPD of claim 1, wherein the data storage memory comprises a semiconductor based memory.

39. The ADGPD of claim 1, wherein the data storage memory comprises random access memory.

40. The ADGPD of claim 1, wherein the data storage memory comprises a single memory device.

41. The ADGPD of claim 1, wherein the program memory comprises electronically programmable read only memory.

42. The ADGPD of claim 1, wherein the processor is adapted to, when the i/o port is operatively interfaced with the multi-purpose interface of the computer, and after the at least one parameter has been sent to the multi-purpose interface of the computer, execute at least one set of computer code stored in the program memory and thereby cause ADGPD file system information to be automatically sent to the i/o port (a) without requiring any end user to load any software onto the computer at any time, (b) without requiring any end user to interact with the computer to set up a file system in the ADGPD at any time, (c) before a time when the computer is able to receive the at least one file of digitized analog data from the data storage memory and (d) regardless of the identity of a manufacturer of the computer.

43. The ADGPD of claim 42, wherein the ADGPD file system information comprises at least an indication of the type of a file system that is used to store the at least one file of digitized analog data in the data storage memory.

44. The ADGPD of claim 42, wherein the at least one parameter is consistent with the ADGPD being an information storage device other than a magnetic floppy disk drive.

45. The ADGPD of claim 44, wherein the at least one parameter is consistent with the ADGPD being a mass storage device.

46. The ADGPD of claim 45,
wherein the processor and the program memory are adapted to be configured to cause, after the at least one parameter has been sent to the i/o port, file allocation table information to be sent to the i/o port,
wherein the processor and the program memory are adapted to be configured to cause a virtual boot sequence to be sent to the i/o port which includes at least information that is representative of a number of sectors of a storage disk, and
wherein the file allocation table information includes at least a start location of a file allocation table.

47. The ADGPD of claim 46, wherein the at least one parameter is consistent with the ADGPD being adapted to operate in a manner consistent with a hard disk drive.

48. The ADGPD of claim 47, wherein the at least one parameter is consistent with the ADGPD being a hard disk drive.

49. The ADGPD of claim 1, wherein the processor includes a single central processing unit.

50. The ADGPD of claim 1, wherein the program memory comprises a single memory device.

51. The ADGPD of claim 1, wherein the program memory is formed in a single chip.

52. The ADGPD of claim 1, wherein the processor comprises a microprocessor.

53. The ADGPD of claim 1, wherein the processor comprises a single microprocessor.

54. The ADGPD of claim 1, wherein the processor comprises a digital signal processor.

55. The ADGPD of claim 1, wherein the processor comprises a single digital signal processor.

56. The ADGPD of claim 1, wherein the processor and the program memory are adapted to be configured to initiate a process by which the at least one file of digitized analog data stored in the data storage memory are directly transferred to an input/output device by means of the i/o port.

57. The ADGPD of claim 56, wherein the processor and the program memory are adapted to allow an aspect of operation of the ADGPD other than the transfer of at least some of the at least one file of digitized analog data from the data storage memory to the i/o port to be controlled by means of the computer.

58. The ADGPD of claim 1, wherein the ADGPD comprises at least a portion of a medical device.

59. The ADGPD of claim 1, wherein the ADGPD comprises at least a portion of a data acquisition system.

60. The ADGPD of claim 1, wherein the ADGPD is designed for use with an external computing device that has an operating system that is designed by a particular software company.

61. The ADGPD of claim 1, wherein the processor is adapted to, when it is involved in the automatic recognition process, execute the at least one instruction set to thereby directly cause the at least one parameter regarding the ADGPD to be automatically sent.

62. The ADGPD of claim 1, wherein the processor is adapted to be employed in the automatic recognition process.

63. The ADGPD of claim 1, wherein the processor is adapted to be directly involved in all aspects of the automatic recognition process.

64. The ADGPD of claim 1, wherein the processor is adapted to be employed in the data generation process.

65. The ADGPD of claim 1, wherein the processor is adapted to be directly involved in all aspects of the data generation process.

66. The ADGPD of claim 1, wherein the analog data is, when the analog data generation process takes place, processed by being subject to a fast Fourier transform.

67. The ADGPD of claim 1, wherein the processed analog data is stored in the data storage memory as only one file of digitized analog data.

68. The ADGPD of claim 1, wherein the ADGPD is designed so that both the analog data generation and automatic file transfer processes, when they occur, take place only after the automatic recognition process has been executed.

69. The ADGPD of claim 1, wherein the analog data generation and automatic file transfer processes, when they occur, at least partially overlap in time.

70. The ADGPD of claim 1, wherein the ADGPD is designed so that the analog data generation process, when it occurs, takes place only after the i/o port is interfaced with the computer.

71. The ADGPD of claim 1, wherein the sensor is designed for two-way communication with the computer.

72. The ADGPD of claim 1, wherein the sensor is designed for one-way or two-way communication with the computer.

73. The ADGPD of claim 1, wherein the sensor is designed to receive data from the computer.

74. The ADGPD of claim 1, wherein the sensor is designed to receive signals from the computer.

75. The ADGPD of claim 1, wherein the ADGPD is designed so that at least one aspect of how the ADGPD creates the at least one file of digitized analog data can be controlled by means of commands that are issueable from a source external to the ADGPD.

76. The ADGPD of claim 75, wherein the ADGPD is designed so that the at least one aspect is controlled by means of a configuration file.

77. The ADGPD of claim 1, wherein the ADGPD is designed to be responsive to a test unit ready command.

78. The ADGPD of claim 1, wherein the set of instructions executed by the processor in the automatic recognition process is stored in a single memory device.

79. The ADGPD of claim 1, wherein the set of instructions executed by the processor in the automatic file transfer process is stored in a single memory device.

80. A combination comprising the ADGPD of claim 1 and a computer.

81. The combination of claim 80, wherein the computer includes a driver for an input/output device customary in a host device.

82. The combination of claim 80, wherein the computer includes at least one customary driver.

83. The combination of claim 80, wherein the computer includes at least one driver for an input/output device customary in a host device.

84. An analog data generating and processing device (ADGPD), comprising:
an input/output (i/o) port;
a program memory;
a data storage memory;
a sensor designed to transmit data;
a processor operatively interfaced with the i/o port, the program memory, the data storage memory and the sensor;
wherein the processor is adapted to be involved in a data generation process by which the sensor generates analog data, the analog data is processed, and the processed analog data is stored in the data storage memory as at least one file of digitized analog data;
wherein the processor also is adapted to be involved in an automatic recognition process in which, when the i/o port is operatively interfaced with a multi-purpose interface of a computer, the processor executes at least one instruction set stored in the program memory and thereby causes at least one parameter which provides identification information regarding the ADGPD to be automatically sent through the i/o port and to the multi-purpose interface of the computer (a) without requiring any end user to load any software onto the computer at any time, (b) without requiring any end user to interact with the computer to set up a file system in the ADGPD at any time, (c) before a time when the computer is able to receive the at least one file of digitized analog data from the data storage memory and (d) regardless of the identity of a manufacturer of the computer;
wherein the processor is adapted to, when the i/o port is operatively interfaced with the multi-purpose interface of the computer, and after the at least one parameter has been sent to a multi-purpose interface of the computer, execute at least one other instruction set stored in the program memory and thereby cause ADGPD file system information to be automatically sent to the i/o port (a) without requiring any end user to load any software onto the computer at any time, (b) without requiring any end user to interact with the computer to set up a file system in the ADGPD at any time, (c) before a time when the computer is able to receive the at least one file of digitized analog data from the data storage memory and (d) regardless of the identity of a manufacturer of the computer, the ADGPD file system information comprises at least an indication of the type of a file system that is used to store the at least one file of digitized analog data in the data storage memory;
wherein the processor is further adapted to be involved in an automatic file transfer process in which, when the i/o port is operatively interfaced with the multi-purpose interface of the computer, and after the at least one parameter has been sent from the i/o port to the multi-purpose interface of the computer, the processor executes at least one set of computer code stored in the program memory and thereby causes the at least one file of digitized analog data to be transferred to the computer regardless of the identity of the manufacturer of the computer and without requiting any user-loaded file transfer enabling software to be loaded on or installed in the computer at any time;

wherein the at least one parameter is consistent with the ADGPD being a mass storage device that operates in a manner consistent with a hard disk drive;

wherein the at least one parameter is further consistent with the ADGPD being responsive to commands issued from a customary driver;

wherein the processor and the program memory are adapted to be configured to cause, after the at least one parameter has been sent to the i/o port, file allocation table information to be sent to the i/o port, the file allocation table information including at least a start location of a file allocation table;

wherein the processor and the program memory are adapted to be configured to cause a virtual boot sequence to be sent to the i/o port which includes at least information that is representative of a number of sectors of a storage disk.

85. The ADGPD of claim 84, wherein the at least one parameter is consistent with the ADGPD being a hard disk drive.

86. An analog data generating and processing device (ADGPD), comprising:
an input/output (i/o) port;
a program memory;
a data storage memory;
a sensor designed to transmit data;
a processor operatively interfaced with the i/o port, the program memory, the data storage memory and the sensor;
wherein the processor is adapted to be involved in a data generation process by which the sensor generates analog data, the analog data is processed, and the processed analog data is stored in the data storage memory as at least one file of digitized analog data;
wherein the processor also is adapted to be involved in an automatic recognition process
(1) in which, when the i/o port is operatively interfaced with a multi-purpose interface of a first computer, the processor executes at least one instruction set stored in the program memory and thereby causes at least one parameter to be automatically sent through the i/o port and to the multi-purpose interface of the first computer (a) without requiring any end user to load any software onto the first computer at any time, (b) without requiring any end user to interact with the first computer to set up a file system in the ADGPD at any time, and (c) before a time when the first computer is able to receive the at least one file of digitized analog data from the data storage memory, and (2) in which, when the i/o port is operatively interfaced with a multi-purpose interface of a second computer that is manufactured by a company other than the company that manufactured the first computer, the processor executes the at least one instruction set stored in the program memory and thereby causes the at least one parameter to be automatically sent through the i/o port and to the multi-purpose interface of the second computer (a) without requiring any end user to load any software onto the second computer at any time, (b) without requiring any end user to interact with the second computer to set up a file system in the ADGPD at any time, and (c) before a time when the second computer is abl to receive the at least one file of digitized analog data from the data storage memory;

wherein the at least one parameter provides identification information regarding the ADGPD;

wherein the at least one parameter is further consistent with the ADGPD being responsive to commands issued from a customary driver;

wherein the processor is further adapted to be involved in an automatic file transfer process (1) in which, when the i/o port is operatively interfaced with the multi\-purpose interface of the first computer, and after the at least one parameter has been received by the multi-purpose interface of the first computer, the processor executes at least one other instruction set stored in the program memory and thereby causes the at least one file of digitized analog data to be transferred to the first computer without requiring any user-loaded file transfer enabling software to be loaded on or installed in the computer at any time, and (2) in which, when the i/o port is operatively interfaced with the multi-purpose interface of the second computer, and after the at least one parameter has been received by the multi-purpose interface of the second computer, the processor executes the at least one other instruction set stored in the program memory and thereby causes the at least one file of digitized analog data to be transferred to the second computer without requiring any user-loaded file transfer enabling software to be loaded on or installed in the computer at any time.

87. The ADGPD of claim 86, wherein the at least one parameter is consistent with the ADGPD being a mass storage device.

* * * * *